US011491766B2

(12) United States Patent
Garcia et al.

(10) Patent No.: US 11,491,766 B2
(45) Date of Patent: Nov. 8, 2022

(54) HYBRID METAL COMPOSITE STRUCTURES, ROCKET MOTORS AND MULTI STAGE ROCKET MOTOR ASSEMBLIES INCLUDING HYBRID METAL COMPOSITE STRUCTURES, AND RELATED METHODS

(71) Applicant: Northrop Grumman Systems Corporation, Falls Church, VA (US)

(72) Inventors: Benjamin W. C. Garcia, Tremonton, UT (US); Braden Day, Nibley, UT (US); Brian Christensen, Willard, UT (US); David R. Nelson, Logan, UT (US); Thomas Loveless, Logan, UT (US); Elizabeth Bonderson, Pleasant View, UT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 492 days.

(21) Appl. No.: 15/250,536

(22) Filed: Aug. 29, 2016

(65) Prior Publication Data

US 2018/0056632 A1 Mar. 1, 2018

(51) Int. Cl.
*B32B 15/14* (2006.01)
*B32B 3/26* (2006.01)
(Continued)

(52) U.S. Cl.
CPC ................ *B32B 15/14* (2013.01); *B32B 3/08* (2013.01); *B32B 3/266* (2013.01); *B32B 5/024* (2013.01);
(Continued)

(58) Field of Classification Search
CPC ........... B32B 3/26; B32B 3/263; B32B 3/266; B32B 3/28; B32B 3/30; B32B 15/04; B32B 15/14; B32B 7/04; B32B 7/045; B32B 7/08; B32B 5/02; B32B 5/022; B32B 5/024; B32B 5/026; B32B 5/028; B32B 5/04; B32B 5/06; B32B 5/08; B32B 5/10;
(Continued)

(56) References Cited

U.S. PATENT DOCUMENTS 5,344,686 A * 9/1994 Heubert ................ B29C 70/023 416/229 A
5,348,603 A 9/1994 Yorgason
(Continued)

OTHER PUBLICATIONS

Velea, M.N., Thermal Expansion of Composite Laminates, 2015, Bulletin of the Transilvania University of Brasov, vol. 8 (Year: 2015 ).*

(Continued)

*Primary Examiner* — Todd E Manahan
*Assistant Examiner* — Kyle Robert Thomas
(74) *Attorney, Agent, or Firm* — TraskBritt

(57) ABSTRACT

A hybrid metal composite (HMC) structure comprises tiers comprising fiber composite material structures, and additional tiers longitudinally adjacent one or more of the tiers and comprising perforated metallic structures and additional fiber composite material structures laterally adjacent the perforated metallic structures. Methods of forming an HMC structure, and related rocket motors and multi-stage rocket motor assemblies are also disclosed.

22 Claims, 6 Drawing Sheets

400 422 418 420 410 414 404 406 412 412 402 408 406 416 420 420 422

(51) Int. Cl.

| | |
|---|---|
| ***F02K 9/97*** | (2006.01) |
| ***F02K 9/76*** | (2006.01) |
| ***B32B 7/04*** | (2019.01) |
| ***B32B 9/04*** | (2006.01) |
| ***B32B 15/09*** | (2006.01) |
| ***B32B 15/08*** | (2006.01) |
| ***B32B 5/30*** | (2006.01) |
| ***B32B 15/088*** | (2006.01) |
| ***B32B 15/085*** | (2006.01) |
| ***B32B 7/02*** | (2019.01) |
| ***B32B 9/00*** | (2006.01) |
| ***B32B 15/082*** | (2006.01) |
| ***B32B 5/06*** | (2006.01) |
| ***B32B 27/28*** | (2006.01) |
| ***B32B 27/42*** | (2006.01) |
| ***B32B 27/36*** | (2006.01) |
| ***B32B 27/06*** | (2006.01) |
| ***B32B 5/02*** | (2006.01) |
| ***B32B 5/16*** | (2006.01) |
| ***B32B 5/22*** | (2006.01) |
| ***B32B 27/34*** | (2006.01) |
| ***B32B 15/18*** | (2006.01) |
| ***B32B 15/092*** | (2006.01) |
| ***B32B 27/30*** | (2006.01) |
| ***B32B 15/20*** | (2006.01) |
| ***B32B 15/098*** | (2006.01) |
| ***B32B 15/095*** | (2006.01) |
| ***B32B 27/32*** | (2006.01) |
| ***B32B 27/38*** | (2006.01) |
| ***F02K 9/60*** | (2006.01) |
| ***B32B 3/08*** | (2006.01) |
| ***B32B 27/40*** | (2006.01) |

(52) U.S. Cl.

CPC .................. *B32B 5/06* (2013.01); *B32B 5/16* (2013.01); *B32B 5/22* (2013.01); *B32B 5/30* (2013.01); *B32B 7/02* (2013.01); *B32B 7/04* (2013.01); *B32B 9/005* (2013.01); *B32B 9/007* (2013.01); *B32B 9/04* (2013.01); *B32B 9/041* (2013.01); *B32B 15/08* (2013.01); *B32B 15/082* (2013.01); *B32B 15/085* (2013.01); *B32B 15/088* (2013.01); *B32B 15/09* (2013.01); *B32B 15/092* (2013.01); *B32B 15/095* (2013.01); *B32B 15/098* (2013.01); *B32B 15/18* (2013.01); *B32B 15/20* (2013.01); *B32B 27/06* (2013.01); *B32B 27/281* (2013.01); *B32B 27/285* (2013.01); *B32B 27/286* (2013.01); *B32B 27/288* (2013.01); *B32B 27/302* (2013.01); *B32B 27/304* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *F02K 9/60* (2013.01); *F02K 9/76* (2013.01); *F02K 9/97* (2013.01); *B32B 2250/42* (2013.01); *B32B 2260/021* (2013.01); *B32B 2260/025* (2013.01); *B32B 2260/046* (2013.01); *B32B 2262/02* (2013.01); *B32B 2262/023* (2013.01); *B32B 2262/0238* (2013.01); *B32B 2262/0253* (2013.01); *B32B 2262/0269* (2013.01); *B32B 2262/0276* (2013.01); *B32B 2262/0292* (2013.01); *B32B 2262/101* (2013.01); *B32B 2262/103* (2013.01); *B32B 2262/105* (2013.01); *B32B 2262/106* (2013.01); *B32B 2307/30* (2013.01); *B32B 2307/306* (2013.01); *B32B 2307/51* (2013.01); *B32B 2307/536* (2013.01); *B32B 2307/546* (2013.01); *B32B 2307/554* (2013.01); *B32B 2307/7145* (2013.01); *B32B 2307/72* (2013.01); *B32B 2307/7248* (2013.01); *B32B 2307/732* (2013.01); *B32B 2605/00* (2013.01); *F05D 2300/10* (2013.01); *F05D 2300/603* (2013.01)

(58) Field of Classification Search

CPC ..... B32B 5/12; F02K 9/60; F02K 9/76; F02K 9/763; F02K 9/34; F05D 2300/10; F05D 2300/603

See application file for complete search history.

(56) References Cited

U.S. PATENT DOCUMENTS

| | | | | |
|---|---|---|---|---|
| 5,866,272 | A | 2/1999 | Westre et al. | |
| 6,037,060 | A | 3/2000 | Blohowiak et al. | |
| 7,115,323 | B2 * | 10/2006 | Westre | B32B 3/14 428/593 |
| 8,636,936 | B2 * | 1/2014 | Modin | B29C 70/545 264/273 |
| 8,715,439 | B2 | 5/2014 | Chakrabarti et al. | |
| 8,925,864 | B2 * | 1/2015 | Sayilgan | B64C 1/12 244/119 |
| 8,993,084 | B2 * | 3/2015 | Griess | B29C 66/14 428/60 |
| 9,090,043 | B2 * | 7/2015 | Matsen | B32B 7/12 |
| 9,102,571 | B2 | 8/2015 | Szweda et al. | |
| 10,112,373 | B2 * | 10/2018 | Griess | B29C 66/50 |
| 2001/0032568 | A1 | 10/2001 | Schutt | |
| 2010/0078259 | A1 * | 4/2010 | Stevenson | B29C 53/562 181/290 |
| 2012/0003495 | A1 * | 1/2012 | Cavaliere | B32B 15/14 428/596 |
| 2012/0045606 | A1 | 2/2012 | Gruess et al. | |
| 2013/0034705 | A1 | 2/2013 | Matsen et al. | |
| 2015/0159587 | A1 * | 6/2015 | Facciano | F02K 9/76 60/250 |
| 2015/0183185 | A1 * | 7/2015 | Chang | B32B 15/08 428/307.3 |
| 2015/0328863 | A1 | 11/2015 | Walsh et al. | |
| 2015/0375478 | A1 | 12/2015 | Gruhn et al. | |
| 2017/0158806 | A1 | 6/2017 | Peters et al. | |

OTHER PUBLICATIONS

The Engineering Tool Box, STP—Standard Temperature and Pressure & NTP—Normal Temperature and Pressure, Jun. 15, 2006 (Year: 2006).*

Garcia et al. U.S. Patent Application Serial No. XX/XXX,XXX, filed Aug. 19, 2016, entitled “Hybrid Metal Composite Structures, Rocket Cases, and Related Methods”, 34 pages.

Thakre et al. “Solid Propellants” Encyclopedia of Aerospace Engineering. p. 1-10, Edited by Richard Blockley and Wei Shyy, 2010 John Wiley & Sons, Ltd. ISBN: 978-0-470-68665-2.

Ucsnik et al “Experimental Investigationof a Novel Hybrid Metal-Composite Joining Technology” Article, Composites: Part A 41 (2010) pp. 369-374; 2009 Elsevier Ltd.

* cited by examiner 110
118
116
Y
X
108
104

110
Y
X
108
104

HYBRID METAL COMPOSITE STRUCTURES, ROCKET MOTORS AND MULTI STAGE ROCKET MOTOR ASSEMBLIES INCLUDING HYBRID METAL COMPOSITE STRUCTURES, AND RELATED METHODS

CROSS-REFERENCE TO RELATED APPLICATION

The present application is related to U.S. patent application Ser. No. 15/250,404, filed Aug. 29, 2016, and entitled, "HYBRID METAL COMPOSITE STRUCTURES, ROCKET CASES, AND RELATED METHODS," now U.S. Pat. No. 10,603,873, issued Mar. 31, 2020, the disclosure of which is hereby incorporated herein it its entirety by this reference

TECHNICAL FIELD

Embodiments disclosed herein relate to hybrid metal composite (HMC) structures, to structures and apparatuses including HMC structures, and to methods of forming an HMC structure. More particularly, embodiments disclosed herein relate to HMC structures including at least one perforated metallic structure; to structures and apparatuses including HMC structures, and to methods of forming an HMC structure.

BACKGROUND

Fiber composite materials include reinforcing fibers embedded in a matrix material. One example of a fiber composite material is a carbon fiber composite (CFC) material, which includes carbon fibers embedded in a matrix material. CFC materials exhibit a variety of desirable properties, such as high temperature stability, high thermal resistance, high structural integrity, light weight, corrosion resistance, and desirable electrical and magnetic properties. CFC materials may, for example, exhibit enhanced strength at a given weight than metal materials. Thus, CFC materials are of interest for use in a wide variety of applications, such as various aerospace, marine, and automotive applications requiring structures having one or more of the aforementioned properties.

Structures formed of composite materials have been coupled together to form components of rocket motors, such as rocket motor casings. However, fiber composite materials may exhibit an increased stress concentration at locations proximate the fasteners (e.g., bolts, rods, pins, etc.) used to couple the fiber composite material structures together. Accordingly, the resulting assembly may exhibit a low bearing strength at locations proximate the fasteners. To overcome such problems, it is known to manufacture fiber composite material structures to have an increased thickness at locations where the fiber composite material structure will be coupled to another material structure (e.g., another fiber composite material structure). In some instances, the fiber composite materials of such structures may be two to three times thicker proximate the fastener regions than in other regions thereof. Unfortunately, increasing the thickness of the fiber composite materials proximate the fastener regions undesirably increases an overall weight of a fiber composite material assembly formed of and including the fiber composite material structures.

Methods of improving the bearing strength of a fiber composite material structure without increasing the thickness thereof include providing thin metallic structures between portions (e.g., tiers, layers) of the fiber composite material to form an HMC structure. The inclusion of the metallic structures may reduce an overall weight of the HMC structure as compared to fiber composite material structures without the metallic structures. However, the metallic structures can create other problems, such as the formation of void spaces (e.g., air gaps) and the accumulation of excess matrix material at interfaces between the fiber composite material and the metallic structures. Such void spaces and excess matrix material can result in increased HMC structure thickness requirements, and can also result in less than desirable strength and structural integrity characteristics in the HMC structure. For example, the presence of the void spaces and the excess matrix material at interfaces between the fiber composite material and the metallic structures can result in poor adhesion between the metallic structures and the fiber composite material. Such poor adhesion can result in delamination of the metallic structures from the fiber composite material, and the failure of the HMC structure.

It would, therefore, be desirable to have new HMC structures and related methods that alleviate one or more of the above problems. It would also be desirable to have new multi-component structural assemblies, rocket motors, and rocket motor assemblies (e.g., multi-stage rocket motor assemblies) including such new HMC structures.

BRIEF SUMMARY

Embodiments described herein include HMC structures, structures and apparatuses including HMC structures, and methods of forming an HMC structure. In accordance with one embodiment described herein, an HMC structure comprises tiers comprising fiber composite material structures, and additional tiers longitudinally adjacent one or more of the tiers and comprising perforated metallic structures and additional fiber composite material structures laterally adjacent the perforated metallic structures.

In additional embodiments, a method of forming an HMC structure comprises forming a first tier comprising a fiber composite material over a substrate. A second tier comprising at least one perforated metallic structure and additional fiber composite material is formed over the first tier. A third tier comprising further fiber composite material is formed over the second tier.

In yet additional embodiments, a rocket motor comprises a casing comprising an HMC structure, a propellant structure within the casing, and a nozzle assembly connected to an aft end of the casing. The HMC structure comprises primary tiers comprising fiber composite material structures, and secondary tiers longitudinally adjacent one or more of the primary tiers and comprising perforated metallic structures and additional fiber composite material structures laterally adjacent the perforated metallic structures.

In further embodiments, a multi-stage rocket motor assembly comprises an outer housing and stages provided in an end-to-end relationship with one another within the outer housing. The outer housing comprises at least one HMC structure comprising tiers comprising fiber composite material structures, and additional tiers longitudinally adjacent one or more of the tiers and comprising perforated metallic structures and additional fiber composite material structures laterally adjacent the perforated metallic structures. Each of the stages independently comprises a casing, a propellant structure within the casing, and a nozzle assembly connected to an aft end of the casing.

DETAILED DESCRIPTION

Figure 1:
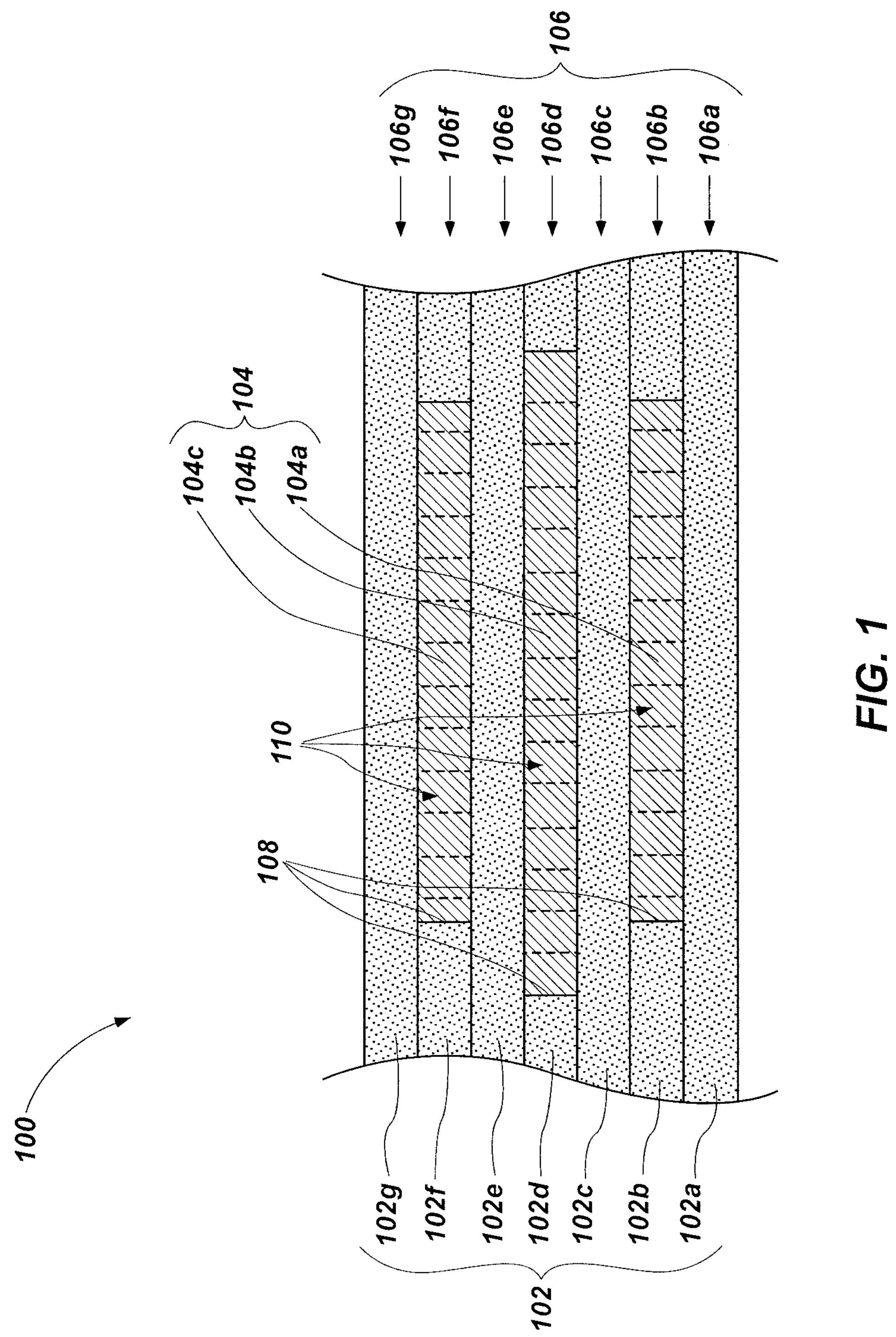
FIG. 1 is a cross-sectional view of an HMC structure, in accordance with embodiments of the disclosure.

HMC structures are described, as are structures and apparatuses (e.g., rocket motors, multi-stage rocket motor assemblies, etc.) including HMC structures, and methods of forming HMC structures. For example, in accordance with an embodiment of the disclosure, an HMC structure includes one or more fiber composite material structures (e.g., carbon fiber composite material structures, etc.) and one or more perforated metallic structures (e.g., metal structures, metal alloy structures, etc.) arranged in tiers. At least one of the tiers may only include at least one of the fiber composite material structures, and at least one other of the tiers may include at least one of the perforated metallic structures and at least one other of the fiber composite material structures. Each of the perforated metallic structures may independently include perforations extending completely therethrough. Properties (e.g., numbers, sizes, shapes, spacing, occupied lateral areas, densities, arrangements, etc.) of the perforations may be selected to permit gases (e.g., air) and excess material (e.g., excess uncured matrix material from uncured fiber composite material structures used to form the fiber composite material structures) to pass (e.g., migrate) through the perforated metallic structures during the formation of the HMC structures so as to mitigate (e.g., reduce, prevent, etc.) the presence of void spaces (e.g., air gaps) and other excess material (e.g., excess cured matrix material) at interfaces between the perforated metallic structures and the fiber composite material structures. The perforated metallic structures may be provided in the HMC structure proximate locations of the HMC structure that will be coupled to one or more other structures (e.g., one or more other HMC structures) to form an assembly. The HMC structures of the disclosure may exhibit an improved strength and structural integrity as compared to conventional HMC structures not including the perforated metallic structures of the disclosure.

The following description provides specific details, such as sizes, shapes, material compositions, and orientations in order to provide a thorough description of embodiments of the disclosure. However, a person of ordinary skill in the art would understand that the embodiments of the disclosure may be practiced without necessarily employing these specific details. Embodiments of the disclosure may be practiced in conjunction with conventional fabrication techniques employed in the industry. In addition, the description provided below does not form a complete process flow for manufacturing an HMC structure, structure including an HMC structure, or apparatus (e.g., rocket motor, rocket motor assembly, etc.) including an HMC structure. Only those process acts and structures necessary to understand the embodiments of the disclosure are described in detail below. Additional acts to form a complete HMC structure, a complete structure including an HMC structure, or a complete apparatus (e.g., a complete rocket motor, a complete rocket motor assembly, etc.) including an HMC structure from the structures described herein may be performed by conventional fabrication processes.

Drawings presented herein are for illustrative purposes only, and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles between surfaces that are illustrated may be rounded, and vice versa. Thus, the regions illustrated in the figures are schematic in nature, and their shapes are not intended to illustrate the precise shape of a region and do not limit the scope of the present claims. The drawings are not necessarily to scale.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the terms "longitudinal," "vertical," "lateral," and "horizontal" and are in reference to a major plane of a substrate (e.g., base material, base structure, base construction, etc.) in or on which one or more structures and/or features are formed and are not necessarily defined by earth's gravitational field. A "lateral" or "horizontal" direction is a direction that is substantially parallel to the major plane of the substrate, while a "longitudinal" or "vertical" direction is a direction that is substantially perpendicular to the major plane of the substrate. The major plane of the substrate is defined by a surface of the substrate having a relatively large area compared to other surfaces of the substrate.

As used herein, spatially relative terms, such as "beneath," "below," "lower," "bottom," "above," "over," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "over" or "above" or "on" or "on top of" other elements or features would then be oriented "below" or "beneath" or "under" or "on bottom of" the other elements or features. Thus, the term "over" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, the terms "configured" and "configuration" refer to a size, shape, material composition, orientation, and arrangement of one or more of at least one structure and at least one apparatus facilitating operation of one or more of the structure and the apparatus in a predetermined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

FIG. 1 is a simplified cross-sectional view of an HMC structure 100, in accordance with an embodiment of the disclosure. The HMC structure 100 includes one or more fiber composite material structures 102 and one or more perforated metallic structures 104 (e.g., metallic plies, metallic sheets, etc.) arranged in tiers 106 (e.g., layers). For clarity and ease of understanding of the drawings and related description, FIG. 1 shows the HMC structure 100 as including seven (7) tiers 106 (i.e., tiers 106*a* through 106*g*) of the fiber composite material structures 102 and the perforated metallic structures 104. However, the HMC structure 100 may include a different number of tiers 106. For example, in additional embodiments, the HMC structure 100 may include greater than seven (7) tiers 106 (e.g., greater than or equal to nine (9) tiers 106, greater than or equal to fifteen (15) tiers 106, greater than or equal to twenty-five (25) tiers 106, or greater than or equal to fifty (50) tiers 106) of the fiber composite material structures 102 and the perforated metallic structures 104, or may include less than seven (7) tiers 106 (e.g., less than or equal to five (5) tiers 106, or less than or equal to three (3) tiers 106) of the fiber composite material structures 102 and the perforated metallic structures 104. In addition, while FIG. 1 depicts a particular configuration of the HMC structure 100, one of ordinary skill in the art will appreciate that the HMC structure 100 may exhibit a different configuration, such as a configuration exhibiting one or more of a different size, a different shape, different features, different feature spacing, different components, and a different arrangement of components. FIG. 1 illustrates just one non-limiting example of the HMC structure 100.

Each of the tiers 106 may include at least one of the fiber composite material structures 102, and one or more of the tiers 106 may also include at least one of the perforated metallic structures 104. The HMC structure 100 may, for example, include an alternating sequence of tiers 106 including at least one of the fiber composite material structures 102 but not including (e.g., free of) at least one of the perforated metallic structures 104, and other tiers 106 including at least one of the fiber composite material structures 102 and at least one of the perforated metallic structures 104. By way of first limiting example, as shown in FIG. 1, the HMC structure 100 may include a first tier 106*a* including a first fiber composite material structure 102*a*; a second tier 106*b* over the first tier 106*a* and including a second fiber composite material structure 102*b* and a first perforated metallic structure 104*a* laterally adjacent the second fiber composite material structure 102*b*; a third tier 106*c* over the second tier 106*b* and including a third fiber composite material structure 102*c*; a fourth tier 106*d* over the third tier 106*c* and including a fourth fiber composite material structure 102*d* and a second perforated metallic structure 104*b* laterally adjacent the fourth fiber composite material structure 102*d*; a fifth tier 106*e* over the fourth tier 106*d* and including a fifth fiber composite material structure 102*e*; a sixth tier 106*f* over the fifth tier 106*e* and including a sixth fiber composite material structure 102*f* and a third perforated metallic structure 104*c* laterally adjacent the sixth fiber composite material structure 102*f*; and a seventh tier 106*g* over the sixth tier 106*f* and including a seventh fiber composite material structure 102*g*. Accordingly, in some embodiments, every other tier 106 of the HMC structure 100 includes at least one of the perforated metallic structures 104. In additional embodiments, the HMC structure 100 may exhibit a different arrangement of the fiber composite material structures 102 and the perforated metallic structures 104 than that depicted in FIG. 1. By way of non-limiting example, in additional embodiments, the HMC structure 100 includes multiple (e.g., more than one) tiers 106 free of (e.g., absent) perforated metallic structures 104 intervening between at least two (2) (e.g., a pair) of the tiers 106 each independently including at least one of the perforated metallic structures 104.

With continued reference to FIG. 1, each of the fiber composite material structures 102 may independently be formed of and include fibers and matrix material. The fibers may be at least partially (e.g., substantially) surrounded (e.g., enveloped) by the matrix material. By way of non-limiting example, each of the fiber composite material structures 102 may independently comprise a fiber preform infiltrated (e.g., impregnated) with matrix material. As used herein, the term "fiber preform" means and includes a structure formed of and including fibers. The fiber preform may comprise a single tow of fibers (e.g., a substantially unidirectional bundle of fibers), a tape of multiple tows of the fibers stitched together using another material, such as a glass material, or a woven fabric of multiple tows of the fiber (e.g., a plain weave of the multiple tows, a 4-harness satin weave of the multiple tows, a 5-harness satin weave of multiple tows, an 8-harness satin weave of the multiple tows, etc.). In some embodiments, at least some of the fibers are provided as a 12 k fiber tow (i.e., a bundle of about 12,000 fibers).

The fibers of the fiber composite material structures 102 may be formed of and include any material(s) compatible with the other components (e.g., the matrix material of the fiber composite material structures 102, the perforated metallic structures 104, etc.) of the HMC structure 100. As used herein, the term "compatible" means and includes a material that does not react with, break down, or absorb another material in an unintended way, and that also does not impair the chemical and/or mechanical properties of the another material in an unintended way. By way of non-limiting example, the fibers of the fiber composite material structures 102 may be formed of and include one or more of carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, fibers including SiC on a carbon core, SiC fibers containing titanium, silicon oxycarbide fibers, silicon oxycarbonitride fibers; etc.), polymeric fibers (e.g., themioplastic fibers, such as one or more of polyethylene (PE) fibers, polypropylene (PP) fibers, polystyrene (PS) fibers, polyvinyl chloride (PVC) fibers, poly (methyl methacrylate) (PMMA) fibers, polycarbonate (PC) fibers, polyphenylene oxide (PPO) fibers, polyetherketone (PEK) fibers, polyetheretherketone (PEEK) fibers, polyaryletherketone (PAEK) fibers, polyetherketoneketone (PEKK) fibers, polyetherketoneetherketoneketone (PEKEKK) fibers, polyether sulfone (PES) fibers, polyphenylene sulfide (PPS) fibers, polyphenylsulfone (PPSU) fibers, self-reinforced polyphenylene (SRP) fibers, aromatic polyamide (PA) fibers, and polyamideimide (PAI) fibers; thermoset plastic fibers, such as one or more of polyimide (PI) fibers, polyurethane (PU) fibers, phenol-formaldehyde fibers, urea-formaldehyde fibers, polyester fibers; etc.), glass fibers, boron fibers, and other fibers. A material composition of the fibers of each of the fiber composite material structures 102 may be selected relative to a material composition of the matrix material of each of the fiber composite material structures 102, as described in further detail below. In some embodiments, the fibers of one or more of the fiber composite material structures 102 comprise carbon fibers. The fibers may constitute from about 10 volume percent (vol %) to about 90 vol % (e.g., from about 25 vol % to about 75 vol %, from about 40 vol % to about 60 vol %, etc.) of the fiber composite material structures 102.

The fibers of the fiber composite material structures 102 may have any desired dimensions (e.g., lengths, widths, thicknesses) compatible with a desired end use of the HMC structure 100. In some embodiments, the fibers comprise intermediate modulus fibers (e.g., intermediate modulus carbon fibers) having a tensile moduli within a range of from about 200 Gigapascals (GPa) to about 350 GPa (e.g., within a range of from about 275 GPa to about 350 GPa). In some embodiments, the fibers exhibit a tensile modulus of about 350 GPa. In additional embodiments, the fibers exhibit a tensile modulus of about 275 GPa. Each of the fibers may independently have a diameter within a range of from about 1 μm to about 100 μm (e.g., from about 1 μm to about 5 μm, from about 5 μm to about 10 μm, from about 10 μm to about 50 μm, from about 50 μm to about 100 μm, etc.). In some embodiments, at least some of the fibers are provided as an intermediate modulus 12 k fiber tow (e.g., intermediate modulus 12 k carbon fiber tow). Suitable intermediate modulus 12 k fiber tows are commercially available from numerous sources, such as from Hexcel Corporation of Stamford, CT under the HEXTOW® trade name (e.g., HEXTOW® IM7 Carbon Fiber).

The matrix material of the fiber composite material structures 102 may be formed of and include any material(s) compatible with the other components (e.g., the fibers of the fiber composite material structures 102, the perforated metallic structures 104, etc.) of the HMC structure 100. The matrix material of each of the fiber composite material structures 102 may be selected relative to the fibers of each of the fiber composite material structures 102 to impart the fiber composite material structures 102 with desirable mechanical properties. By way of non-limiting example, the matrix material of the fiber composite material structures 102 may be formed of and include one or more of a ceramic material (e.g., an oxide ceramic material, such as one or more of an alumina material, an alumina-silica material, an alumina-boria-silica material, a zirconia material, etc.; a non-oxide ceramic material, such as one or more of a SiC material, a SiN material, a silicon hexaboride material, an aluminum nitride material, a boron nitride material, a boron carbide material, a titanium boride material, a titanium carbide material, and a hafnium carbide material), a polymeric material (e.g., an epoxy material; a thermoplastic polymer material, such as one of more of a PE material, a PP material, a PS material, a PVC material, a PMMA material, a PC material, a PPO material, a PEK material, a PEEK material, a PAEK material, a PEKK material, a PEKEKK material, a PES material, a PPS material, a PPSU material, a polyphenylene material, a PA material, and a PAI material; thermoset plastic material, such as one or more of a PI material, a PU material, a phenol-formaldehyde material, a urea-formaldehyde material, and a polyester material), a glass material, a carbon-containing material, and a boron-containing material. In some embodiments, the matrix material comprises an epoxy material. The matrix material may constitute from about 10 vol % to about 90 vol % (e.g., from about 25 vol % to about 75 vol %, from about 40 vol % and about 60 vol %, etc.) of the fiber composite material structures 102.

Each of the tiers 106 may independently include any desired thickness (e.g., height) of the fiber composite material structure 102 therein, such as a thickness less than or equal to about 0.030 inch (about 762 micrometers (μm)) (e.g., less than or equal to about 0.020 inch (about 508 μm), less than or equal to about 0.015 inch (about 381 μm), less than or equal to about 0.005 inch (about 127 μm), less than or equal to about 0.003 inch (about 76.2 μm), less than or equal to about 0.001 inch (about 25.4 μm); etc.). In tiers 106 (e.g., the second tier 106*b*, the fourth tier 106*d*, the sixth tier 106*f*, etc.) including at least one fiber composite material structure 102 and at least one perforated metallic structure 104, the thickness of the fiber composite material structure 102 may correspond to (e.g., be the same as) a thickness of the perforated metallic structure 104.

Each of the fiber composite material structures 102 of the HMC structure 100 may have substantially the same material composition and thickness, or at least one of the fiber composite material structures 102 of the HMC structure 100 may have one or more of a different material composition and a different thickness than at least one other of the fiber composite material structures 102. In some embodiments, each of the fiber composite material structures 102 has substantially the same material composition and thickness as each other of the fiber composite material structures 102. In additional embodiments, each of the fiber composite material structures 102 exhibits substantially the same material composition, but at least one of the fiber composite material structures 102 exhibits a different thickness than at least one other of the fiber composite material structures 102. In further embodiments, each of the fiber composite material structures 102 exhibits substantially the same thickness, but at least one of the fiber composite material structures 102 exhibits a different material composition than at least one other of the fiber composite material structures 102. In yet further embodiments, one or more (e.g., each) of the fiber composite material structures 102 exhibits a different material composition and a different thickness than one or more (e.g., each) other of the fiber composite material structures 102.

With continued reference to FIG. 1, each of the perforated metallic structures 104 may independently be formed of and include a metal-containing material capable of imparting the HMC structure 100 with enhanced strength and structural integrity as compared to composite material structures not including the perforated metallic structures 104. For example, each of the perforated metallic structures 104 may independently be formed of and include iron (Fe), cobalt (Co), nickel (Ni), copper (Cu), aluminum (Al), magnesium (Mg), titanium (Ti), tungsten (W), molybdenum (Mo), niobium (Nb), vanadium (V), hafnium (Hf), tantalum (Ta), chromium (Cr), zirconium (Zr), silicon (Si), alloys thereof, carbides thereof, nitrides thereof, oxides thereof, or combinations thereof. As a non-limiting example, one or more (e.g., each) of the perforated metallic structures 104 may be formed of and include an elemental metal, such as one or more of elemental Al, elemental Ti, elemental Hf, elemental Ta, elemental Cr, and elemental W. As another non-limiting example, one or more (e.g., each) of the perforated metallic structures 104 may be formed of and include a metal alloy, such as one or more of an Fe-containing alloy, a Ni-containing alloy, a Co-containing alloy, an Fe- and Ni-containing alloy, a Co- and Ni-containing alloy, an Fe- and Co-containing alloy, an Al-containing alloy, a Cu-containing alloy, a Mg-containing alloy, and a Ti-containing alloy. In some embodiments, one or more (e.g., each) of the perforated metallic structures 104 are formed of and include elemental Ti. In additional embodiments, one or more (e.g., each) of the perforated metallic structures 104 are formed of and include an Fe-containing alloy (e.g., a steel-alloy, such as a stainless steel, a mild steel, etc.). Each of the perforated metallic structures 104 may have substantially the same material composition, or at least one of the perforated metallic structures 104 may have a different material composition than at least one other of the perforated metallic structures 104.

The perforated metallic structures 104 may have material properties (e.g., mechanical properties, rheological properties, physical properties, chemical properties, etc.) substantially compatible with material properties of the fiber composite material structures 102. By way of non-limiting example, one or more (e.g., each) of the perforated metallic structures 104 may independently have one or more of a coefficient of thermal expansion, an elastic (e.g., Young's) modulus, a bulk modulus, a tensile strength, a hardness, a thermal resistance, an abrasion resistance, and a chemical resistance substantially similar to that of one or more of the fibers and the matrix material of one or more (e.g., each) of the fiber composite material structures 102. In some embodiments, each of the perforated metallic structures 104 has a coefficient of thermal expansion within a range of from about $3\times10^{-6}$/K to about $25\times10^{-6}$/K at about 25° C., and a coefficient of thermal expansion of at least the matrix material of each of the fiber composite material structures 102 is within a range of from about $3\times10^{-6}$/K to about $150\times10^{-6}$/K at about 25° C. (e.g., from about $45\times10^{-6}$/K to about $65\times10^{-6}$/K at about 25° C.).

The HMC structure 100 may include any suitable number of the perforated metallic structures 104. For clarity and ease of understanding of the drawings and related description, FIG. 1 shows the HMC structure 100 as including three (3) perforated metallic structures 104 (i.e., the first perforated metallic structure **104*a* in the second tier 106*b*, the second perforated metallic structure 104*b* in the fourth tier 106*d*, and the third perforated metallic structure 104*c* in the sixth tier 106*f*). However, the HMC structure 100 may include a different number of perforated metallic structures 104. For example, in additional embodiments, the HMC structure 100 may include greater than three (3) perforated metallic structures 104 (e.g., greater than or equal to five (5) perforated metallic structures 104, greater than or equal to nine (9) perforated metallic structures 104, greater than or equal to fifteen (15) perforated metallic structures 104, or greater than or equal to twenty-five (25) perforated metallic structures 104), or may include less than three (3) perforated metallic structures 104 (e.g., less than or equal to two (2) perforated metallic structures 104, or only one (1) perforated metallic structure 104). The perforated metallic structures 104 may constitute from about 1 vol % to about 60 vol % (e.g., from about 15 vol % to about 50 vol %, from about 25 vol % to about 45 vol %, etc.) of the HMC structure 100. In some embodiments, the perforated metallic structures constitute from about 25 vol % to about 45 vol % the of the HMC structure 100**.

Each of the perforated metallic structures 104 may independently exhibit any desired peripheral dimensions (e.g., width, length, and height) permitting the perforated metallic structures 104 to enhance the strength and mechanical (e.g., structural) integrity of a region (e.g., an area, a portion) of the HMC structure 100 including the perforated metallic structures 104 as compared to another region of the HMC structure 100 not including the perforated metallic structures 104. Each of the perforated metallic structures 104 may independently exhibit a thickness (e.g., height) less than or equal to about 0.050 inch (about 1270 micrometers (μm)), such as within a range of from about 0.001 inch (about 25.4 μm) to about 0.030 inch (about 762 μm) (e.g., from about 0.003 inch (about 76.2 μm) to about 0.020 inch (about 508 μm), from 0.005 inch (about 127 μm) to about 0.015 inch (about 381 μm), etc.). In some embodiments, one or more (e.g., each) of the perforated metallic structures 104 exhibits a thickness of about 0.01 inch (about 254 μm). Each of the perforated metallic structures 104 may exhibit substantially the same peripheral dimensions (e.g., substantially the same width, substantially the same length, and substantially the same height), or at least one of the perforated metallic structures 104 may exhibit one or more different peripheral dimensions (e.g., a different width, a different length, and/or a different height) than at least one other of the perforated metallic structures 104. As shown in FIG. 1, in some embodiments, a width of the perforated metallic structure 104 within at least one of the tiers 106 (e.g., one or more of the second tier **106*b*, the fourth tier 106*d*, and the sixth tier 106*f*) may be different than (e.g., larger than, smaller than) a width of the perforated metallic structure 104 within at least one other of the tiers 106 (e.g., one or more other of the second tier 106*b*, the fourth tier 106*d*, and the sixth tier 106*f*). By way of non-limiting example, the second perforated metallic structure 104*b* within the fourth tier 106*d* may be exhibit a different width (e.g., a smaller width) than widths of the first perforated metallic structure 104*a* within the second tier 106*b* and the third perforated metallic structure 104*c* within the sixth tier 106*f*. In additional embodiments, each of the perforated metallic structures 104** may exhibit substantially with same width.

As shown in FIG. 1, perforated metallic structures 104 in different tiers 106 than one another may be substantially aligned with each other. Accordingly, at least in embodiments wherein perforated metallic structures 104 in different tiers 106 than one another exhibit different lateral dimensions (e.g., different widths) than each other, lateral edges 108 (e.g., sidewalls) of the perforated metallic structures 104 in different the tiers 106 than one another may be laterally offset from each other. By way of non-limiting example, lateral edges 108 of the second perforated metallic structure 104*b* within the fourth tier 106*d* may be laterally offset from those of the first perforated metallic structure 104*a* within the second tier 106*b* and the third perforated metallic structure 104*c* within the sixth tier 106*f*. In additional embodiments, one or more of the perforated metallic structures 104 may be unaligned with one or more other of the perforated metallic structures 104 in different tiers 106, and/or each of the perforated metallic structures 104 may exhibit lateral edges 108 substantially coplanar with lateral edges 108 of each other of the perforated metallic structures 104.

Each of the perforated metallic structures 104 may independently exhibit any peripheral shape compatible with a desired end use of the HMC structure 100. By way of non-limiting example, the perforated metallic structures 104 may exhibit one or more of rectangular peripheral shapes, square peripheral shapes, trapezoidal peripheral shapes, annular peripheral shapes, circular peripheral shapes, semi-circular peripheral shapes, crescent peripheral shapes, ovular peripheral shapes, astroidal peripheral shapes, deltoidal peripheral shapes, ellipsoidal peripheral shapes, triangular peripheral shapes, parallelogram peripheral shapes, kite peripheral shapes, rhomboidal peripheral shapes, pentagonal peripheral shapes, hexagonal peripheral shapes, heptagonal peripheral shapes, octagonal peripheral shapes, enneagonal peripheral shapes, decagonal peripheral shapes, truncated versions thereof, and irregular peripheral shapes. In some embodiments, one or more (e.g., each) of the perforated metallic structures 104 exhibits a generally rectangular peripheral shape. Each of the perforated metallic structures 104 may exhibit substantially the same peripheral shape, or at least one of the perforated metallic structures 104 may exhibit a different peripheral shape than at least one other of the perforated metallic structures 104.

With continued reference to FIG. 1, one or more (e.g., each) of the perforated metallic structures 104 may include perforations 110 (e.g., apertures, openings, vias, etc.) (as shown by broken lines in FIG. 1) at least partially (e.g., completely) extending therethrough. The perforations 110 may be configured (e.g., sized, shaped, etc.) and positioned to minimize (e.g., reduce, prevent) the presence of void spaces (e.g., air gaps) and/or excess matrix material at interfaces between the fiber composite material structures 102 and perforated metallic structures 104. The perforations 110 may, for example, facilitate the migration of gases (e.g., air) and excess precursors (e.g., uncured precursors) to the matrix material through and out of the fiber composite material structures 102 and the perforated metallic structures 104 during the formation of the HMC structures 100, as described in further detail below.

One or more (e.g., each) of the perforations 110 in the perforated metallic structures 104 may comprise through perforations (e.g., through apertures, through openings, through vias, etc.) extending completely through the perforated metallic structure 104 associated therewith. For example, as shown in FIG. 1, each of the perforations 110 in the first perforated metallic structure 104*a* may extend completely through the first perforated metallic structure 104*a*, each of the perforations 110 in the second perforated metallic structure 104*b* may extend completely through the second perforated metallic structure 104*b*, and each of the perforations 110 in the third perforated metallic structure 104*c* may extend completely through the third perforated metallic structure 104*c*. In additional embodiments, one or more of the perforations 110 in the perforated metallic structures 104 may comprise blind perforations (e.g., blind apertures, blind openings, blind vias, etc.) extending only partially through the perforated metallic structure 104 associated therewith, so long as at least one other of the perforations 110 in the perforated metallic structure 104 comprises through perforations. For example, one or more of the perforations 110 in the first perforated metallic structure 104*a* may extend partially through the first perforated metallic structure 104*a* and one or more other of the perforations 110 in the first perforated metallic structure 104*a* may extend completely through the first perforated metallic structure 104*a*, one or more of the perforations 110 in the second perforated metallic structure 104*b* may extend partially through the second perforated metallic structure 104*b* and one or more other of the perforations 110 in the second perforated metallic structure 104*b* may extend completely through the second perforated metallic structure 104*b*, and/or one or more of the perforations 110 in the third perforated metallic structure 104*c* may extend partially through the third perforated metallic structure 104*c* and one or more other of the perforations 110 in the third perforated metallic structure 104*c* may extend completely through the third perforated metallic structure 104*c*.

Figure 2A:
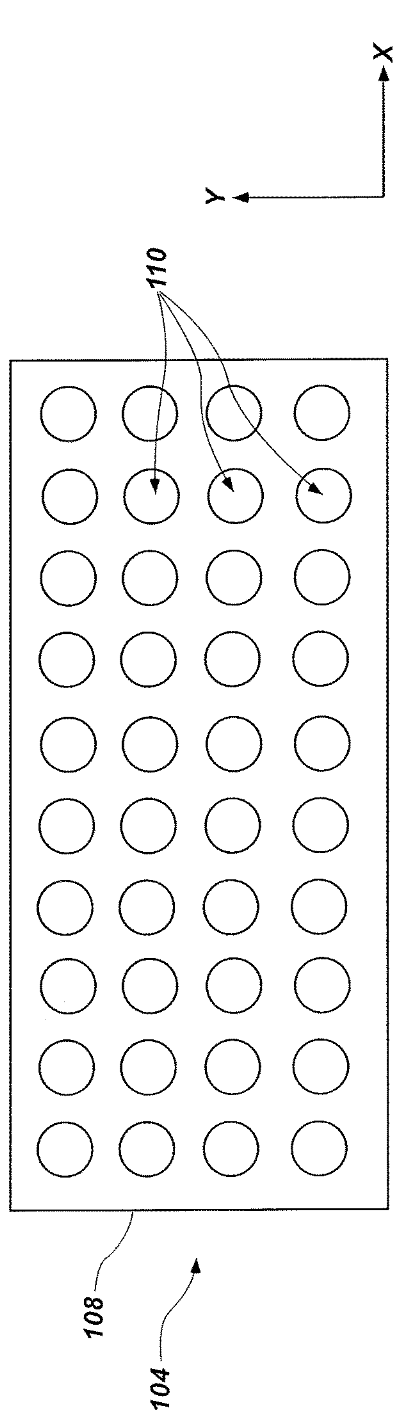
FIGS. 2A through 2D are simplified perspective views of different perforated metallic structure configurations for the HMC structure shown in FIG. 1, in accordance with embodiments of the disclosure.
Figure 2B:
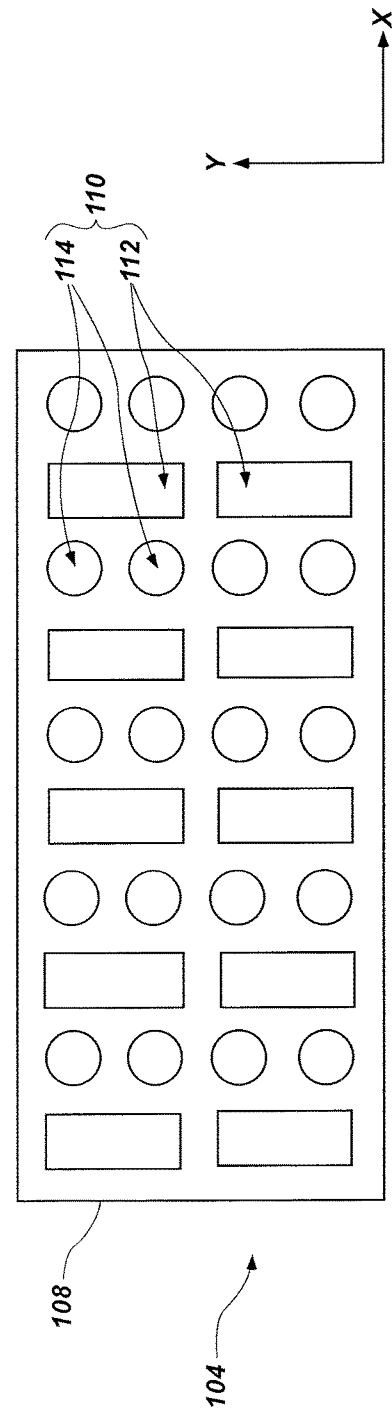

Each of the perforations 110 in the perforated metallic structures 104 may independently exhibit any desired shape. By way of non-limiting example, the perforations 110 in the perforated metallic structures 104 may exhibit one or more of cylindrical shapes, semi-cylindrical shapes, cuboidal shapes, cubic shapes, conical shapes, pyramidal shapes, truncated versions thereof, and irregular shapes. Referring to FIG. 2A, which, in accordance with embodiments of the disclosure, shows a top-down view of a potential configuration of one of the perforated metallic structures 104 of the HMC structure 100 shown in FIG. 1, one or more (e.g., each) of the perforations 110 in the perforated metallic structure 104 may exhibit a generally cylindrical shape. Accordingly, as shown in FIG. 2A, at least some (e.g., each) of the perforations 110 in the perforated metallic structure 104 may exhibit a substantially circular lateral cross-sectional shape. In additional embodiments, one or more of the perforations 110 in one or more of the perforated metallic structures 104 may exhibit a non-cylindrical shape. For example, referring to FIG. 2B, which, in accordance with additional embodiments of the disclosure, shows a top-down view of another potential configuration of one of the perforated metallic structures 104 of the HMC structure 100 shown in FIG. 1, at least some of the perforations 110 in the perforated metallic structure 104 may exhibit a generally cuboidal shape. Accordingly, as shown in FIG. 2B, at least some of the perforations 110 in the perforated metallic structure 104 may exhibit a substantially rectangular lateral cross-sectional shape. In some embodiments, less than all of the perforations 110 in the perforated metallic structure 104 exhibit a non-cylindrical shape. For example, as shown in FIG. 2B, a first portion 112 of the perforations 110 in the perforated metallic structure 104 may exhibit a non-cylindrical shape (e.g., a cuboidal shape), and a second portion 114 of the perforations 110 in the perforated metallic structure 104 may exhibit a cylindrical shape. In additional embodiments, each of the perforations 110 in the perforated metallic structure 104 exhibits a cylindrical shape.

Referring again to FIG. 1, the perforations 110 in the perforated metallic structures 104 of the HMC structure 100 may independently exhibit any dimensions (e.g., width, length, and height) permitting the perforated metallic structures 104 to enhance the strength and structural integrity of a region of the HMC structure 100 including the perforated metallic structures 104 and also permitting the migration of gases (e.g., air) and/or other materials (e.g., precursor(s) to the matrix material(s) of the fiber composite material structures 102) through the perforated metallic structures 104 during the formation of the HMC structure 100. The dimensions of the perforations 110 within a single perforated metallic structure 104 of the HMC structure 100 may at least partially depend on a predetermined spacing, quantity, density, and distribution of the perforations 110 in the single perforated metallic structure 104, as described in further detail below. As a non-limiting example, the perforations 110 in the perforated metallic structures 104 of the HMC structure 100 may each independently exhibit a width (e.g., diameter) within a range of from about 0.001 inch (25.4 μm) to about 0.15 inch (about 3,810 μm) (e.g., from about 0.001 inch (about 25.4 μm) to about 0.1 inch (about 2,540 μm), from about 0.005 inch (about 127 μm) to about 0.1 inch (about 2,540 μm), from about 0.01 inch (about 254 μm) to about 0.1 inch (about 2,540 μm), from about 0.02 inch (about 508 μm) to about 0.1 inch (about 2,540 μm), etc.). In some embodiments, each of the perforations 110 in the perforated metallic structures 104 independently exhibits a width within a range of from about 0.01 inch (about 254 μm) to about 0.1 inch (about 2,540 μm). In addition, each of perforations 110 may exhibit substantially the same width throughout the thickness of the perforated metallic structure 104 associated therewith, or a width of at least one of the perforations 110 may vary throughout thickness of the perforated metallic structure 104 associated therewith.

Figures 2C, 2D:
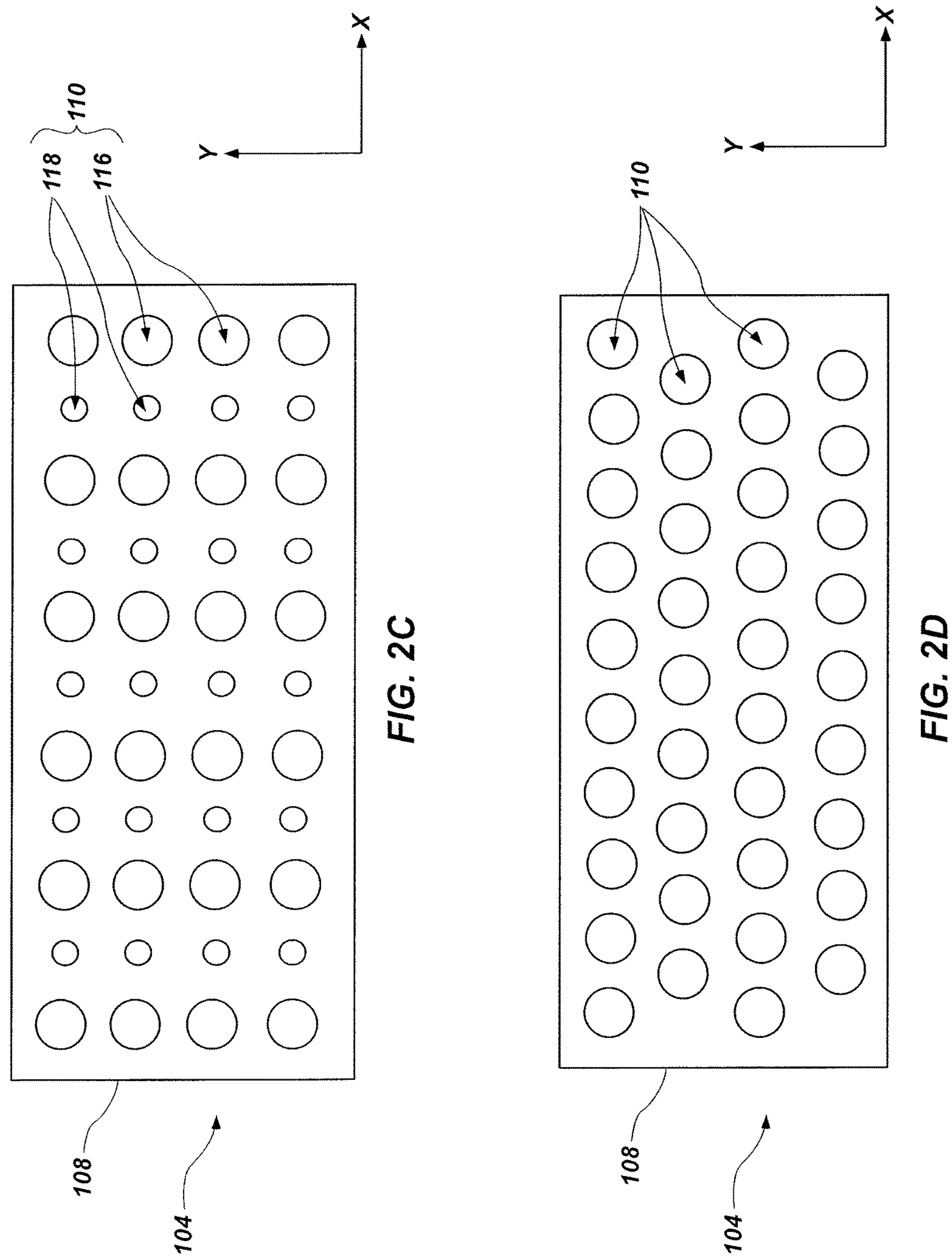

Each of the perforations 110 in a single perforated metallic structure 104 of the HMC structure 100 may exhibit substantially the same lateral dimensions (e.g., substantially the same width, substantially the same length) as one another, or at least one of the perforations 110 in a single perforated metallic structure 104 of the HMC structure 100 may exhibit one or more different lateral dimensions than at least one other of the perforations 110 in the single perforated metallic structure 104 of the HMC structure 100. In some embodiments, each of the perforations 110 in a single perforated metallic structure 104 of the HMC structure 100 exhibits substantially the same lateral dimensions as each other of the perforations 110 in a single perforated metallic structure 104 of the HMC structure 100. For example, referring to FIG. 2A, in some embodiments wherein each of the perforations 110 exhibits a generally cylindrical shape, each of the perforations 110 may exhibit substantially the same diameter. In additional embodiments, one or more of the perforations 110 in a single perforated metallic structure 104 of the HMC structure 100 exhibit one or more different lateral dimensions (e.g., a different width, a different length) than one or more other of the perforations 110 in the single perforated metallic structure 104 of the HMC structure 100. For example, referring to FIG. 2B, in some embodiments wherein a first portion 112 of the perforations 110 in a single perforated metallic structure 104 of the HMC structure 100 exhibits a different shape than a second portion 114 of the perforations 110 in a single perforated metallic structure 104 of the HMC structure 100, the first portion 112 of the perforations 110 may exhibit one or more different lateral dimensions than the second portion 114 of the perforations 110. As another example, referring to FIG. 2C, which, in accordance with additional embodiments of the disclosure, shows a top-down view of another potential configuration of one of the perforated metallic structures 104 of the HMC structure 100 shown in FIG. 1, each of the perforations 110 in a single perforated metallic structure 104 may exhibit substantially the same shape (e.g., a generally cylindrical shape), but a first portion 116 of the perforations 110 may exhibit one or more different lateral dimensions (e.g., a different diameter, such as a larger diameter) than a second portion 118 of the perforations 110.

Referring again to FIG. 1, each perforation 110 in a single perforated metallic structure 104 (e.g., in the first perforated metallic structure 104*a*, in the second perforated metallic structure 104*b*, in the third perforated metallic structure 104*c*) may independently be laterally spaced apart from each adjacent perforation 110 of the single perforated metallic structure 104 by any distance permitting the perforated metallic structures 104 to enhance the strength and structural integrity of a region of the HMC structure 100 including the perforated metallic structures 104 and also permitting the migration of gases and/or other materials through the perforated metallic structures 104 during the formation of the HMC structure 100. The spacing between adjacent perforations 110 within the single perforated metallic structure 104 of the HMC structure 100 may at least partially depend on a size, quantity, density, and distribution of the perforations 110 in the single perforated metallic structure 104. As a non-limiting example, adjacent perforations 110 in a single perforated metallic structure 104 of the HMC structure 100 may be spaced apart from each other by a distance within a range of from about 0.001 inch (about 25.4 μm) to about 1.0 inch (about 25,400 μm) (e.g., from about 0.001 inch (about 25.4 μm) to about 0.8 inch (about 20,320 μm), from about 0.1 inch (about 2,540 μm) to about 0.75 inch (about 19,050 μm), from about 0.2 inch (about 5,080 μm) to about 0.75 inch (about 19,050 μm), etc.). In some embodiments, adjacent perforations 110 in a single perforated metallic structure 104 of the HMC structure 100 are spaced apart from each other by a distance within a range of from about 0.2 inch (about 5,080 μm) to about 0.75 inch (about 19,050 μm).

The perforations 110 in a single perforated metallic structure 104 of the HMC structure 100 may be substantially uniformly spaced, or may be non-uniformly spaced. In some embodiments, the perforations 110 in a single perforated metallic structure 104 of the HMC structure 100 are substantially uniformly spaced apart from one another. For example, each perforation 110 in a single perforated metallic structure 104 of the HMC structure 100 may be spaced apart from each adjacent perforation 110 in the single perforated metallic structure 104 by substantially the same distance. In additional embodiments, the perforations 110 in a single perforated metallic structure 104 of the HMC structure 100 are non-uniformly spaced apart from one another. For example, at least one perforation 110 in a single perforated metallic structure 104 of the HMC structure 100 may be spaced apart from at least one adjacent perforation 110 in the single perforated metallic structure 104 by a different distance than that between the at least one perforation 110 and at least one other adjacent perforation 110 in the single perforated metallic structure 104.

The perforated metallic structures 104 of the HMC structure 100 may each independently exhibit any quantity (e.g., number) of the perforations 110 permitting the perforated metallic structures 104 to enhance the strength and structural integrity of a region of the HMC structure 100 including the perforated metallic structures 104 and also permitting the migration of gases and/or other materials through the perforated metallic structures 104 during the formation of the HMC structure 100. As a non-limiting example, each of the perforated metallic structures 104 of the HMC structure 100 may independently exhibit a density of the perforations 110 within a range of from about 100 perforations per square foot (perforations/$ft^2$) (about 1107 perforations per square meter (perforations/$m^2$)) to about 5,000 perforations/$ft^2$ (about $5.53\times10^4$ perforations/$m^2$) (e.g., from about 150 perforations/$ft^2$ (about 1661 perforations/$m^2$)) to about 4,000 perforations/$ft^2$ (about $4.43\times10^4$ perforations/$m^2$); from about 200 perforations/$ft^2$ (about 2214 perforations/$m^2$) to about 3,500 perforations/$ft^2$ (about $3.88\times10^4$ perforations/$m^2$); etc. In some embodiments, each of the perforated metallic structures 104 of the HMC structure 100 independently exhibits a density of the perforations 110 within a range of from about 150 perforations/$ft^2$ (about 1661 perforations/$m^2$) to about 4,000 perforations/$ft^2$ (about $4.43\times10^4$ perforations/$m^2$).

A lateral area occupied by the perforations 110 in a single perforated metallic structure 104 of the HMC structure 100 may constitute (e.g., make up) any percentage of the overall lateral area (e.g., the total lateral area between the peripheral lateral boundaries) of the perforated metallic structure 104 sufficient to enhance the strength and structural integrity of a region of the HMC structure 100 including the perforated metallic structures 104 while also facilitating the migration of gases and/or other materials through the perforated metallic structures 104 during the formation of the HMC structure 100. As a non-limiting example, a lateral area occupied by the perforations 110 in a single perforated metallic structure 104 of the HMC structure 100 may constitute from about 0.1 percent to about 30 percent (e.g., from about 0.1 percent to about 20 percent, from about 0.5 percent to about 15 percent, from about 1.0 percent to about 10 percent, from about 2.0 percent to about 7 percent, from about 3.0 percent to about 5.0 percent) of the overall lateral area of the perforated metallic structure 104. In some embodiments, the lateral area occupied by the perforations 110 in a single perforated metallic structure 104 of the HMC structure 100 may constitute from about 3.0 percent to about 5.0 percent of the overall lateral area of the perforated metallic structure 104.

Each of the perforated metallic structures 104 of the HMC structure 100 may independently exhibit any desired distribution (e.g., pattern) of the perforations 110 permitting the perforated metallic structures 104 to enhance the strength and structural integrity of a region of the HMC structure 100 including the perforated metallic structures 104 and also permitting the migration of gases and/or other materials through the perforated metallic structures 104 during the formation of the HMC structure 100. The perforations 110 in a single perforated metallic structure 104 of the HMC structure 100 may be symmetrically distributed across the perforated metallic structure 104, or may be asymmetrically distributed across the perforated metallic structure 104. Referring to FIG. 2A, in some embodiments, the perforations 110 in a single perforated metallic structure 104 are distributed as an array including rows of the perforations 110 in an X direction and columns of the perforations 110 extending in a Y direction substantially perpendicular to the X direction. By way of non-limiting example, as shown in FIG. 2A, the perforations 110 may be arranged as a square (e.g., rectilinear) array, wherein the spacing (e.g., distance, separation) between adjacent perforations 110 in each row of the perforations 110 is substantially the same as the spacing between adjacent perforations 110 in each column of the perforations 110. In additional embodiments, the perforations 110 in a single perforated metallic structure 104 may be arranged as a non-square (e.g., non-rectilinear) array. By way of non-limiting example, referring to FIG. 2D, which, in accordance with additional embodiments of the disclosure, shows a top-down view of another potential configuration of one of the perforated metallic structures 104 of the HMC structure 100 shown in FIG. 1, the perforations 110 in a single perforated metallic structure 104 may be arranged as a hexagonal (e.g., staggered) array. In such embodiments, the spacing between adjacent perforations 110 in each column of the perforations 110 may be about two times (2×) as large as the spacing between adjacent perforations 110 in each row of the perforations 110, or vice versa.

With returned reference to FIG. 1, in some embodiments, each of the perforated metallic structures 104 (e.g., each of the first perforated metallic structure 104*a*, the second perforated metallic structure 104*b*, and the third perforated metallic structure 104*c*) of the HMC structure 100 exhibit substantially the same sizes, shapes, spacing, density, occupied lateral area, and arrangement of the perforations 110 therein as each other of the perforated metallic structures 104 (e.g., each other of the first perforated metallic structure 104*a*, the second perforated metallic structure 104*b*, and the third perforated metallic structure 104*c*). By way of non-limiting example, each of the perforated metallic structures 104 may exhibit one of the configurations shown in FIGS. 2A through 2D. In additional embodiments, one or more of the perforated metallic structures 104 (e.g., one or more of the first perforated metallic structure 104*a*, the second perforated metallic structure 104*b*, and the third perforated metallic structure 104*c*) of the HMC structure 100 exhibits one or more of different sizes, different shapes, different spacing, a different density, a different occupied lateral area, and a different arrangement of the perforations 110 therein than one or more other of the perforated metallic structures 104 (e.g., one or more other of the first perforated metallic structure 104*a*, the second perforated metallic structure 104*b*, and the third perforated metallic structure 104*c*). By way of non-limiting example, one or more of the perforated metallic structures 104 may exhibit one of the configurations shown in FIGS. 2A through 2D, and one or more other of the perforated metallic structures 104 may exhibit another of the configurations shown in FIGS. 2A through 2D. In some embodiments, at least two of the perforated metallic structures 104 of the HMC structure 100 exhibit substantially the same sizes, shapes, spacing, density, and arrangement of perforations 110 therein, but at least one of the at least two perforated metallic structures 104 exhibits a different quantity (e.g., number) of perforations 110 therein than at least one other of the at least two perforated metallic structures 104 as a result of one or more differences in the lateral peripheral dimensions of the at least two perforated metallic structures 104.

The perforated metallic structures 104, including the perforations 110 therein, may be formed using conventional processes (e.g., laser treatment processes, mechanical drilling processes, die punch perforation processes, etc.) and conventional processing equipment, which are not described in detail herein. By way of non-limiting example, at least one of the perforated metallic structures 104 may be formed by subjecting at least one non-perforated metallic structure having a desirable peripheral geometric configuration (e.g., a desirable peripheral shape, desirable peripheral dimensions) to a die punch perforation process employing a punch and die device having a structural configuration (e.g., component sizes, such as a die plate size, punch sizes, etc.; component shapes, such as die plate shape, punch shapes, etc.; etc.) that imparts the at least one non-perforated metallic structure with a desired configuration (e.g., sizes, shapes, spacing, quantity, density, occupied lateral area, arrangement, etc.) of the perforations 110 therein. In additional embodiments, at least one of the perforated metallic structures 104 may be formed by subjecting at least one non-perforated metallic structure exhibiting a desirable peripheral geometric configuration to one or more of a laser treatment process (e.g., a laser machining process, a laser drilling process, etc.) and a mechanical drilling process.

Figure 3:
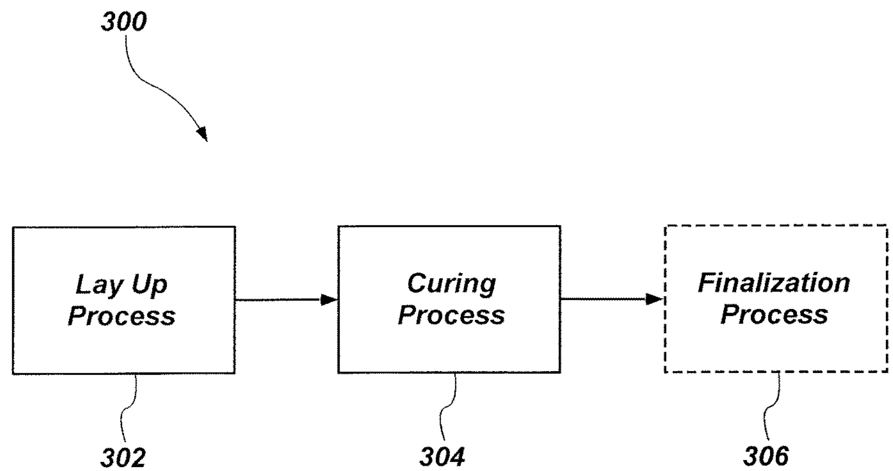
FIG. 3 is a simplified flow diagram illustrating a method of forming the HMC structure shown in FIG. 1, in accordance with embodiments of the disclosure.

FIG. 3 is a simplified flow diagram illustrating a method 300 of forming the HMC structure 100 (FIG. 1), in accordance with embodiments of the disclosure. The method may include a lay up process 302 including forming an uncured HMC structure exhibiting the general structure of the HMC structure 100 on or over a surface of a substrate, a curing process 304 including curing the uncured HMC structure to form the HMC structure 100, and, optionally, a finalization process 306 including further treating (e.g., densifying, machining, coating, etc.) the HMC structure 100. With the description as provided below, it will be readily apparent to one of ordinary skill in the art that the method described herein may be used in various applications. In other words, the method may be used whenever it is desired to form an HMC structure.

The lay up process 302 includes forming a first tier (e.g., corresponding to the first tier 106*a* of the HMC structure 100 shown in FIG. 1) including uncured fiber composite material on or over at least one surface of a substrate, forming a second tier (e.g., corresponding to the second tier 106*b* of the HMC structure 100 shown in FIG. 1) including additional uncured fiber composite material and at least one perforated metallic structure (e.g., corresponding to the first perforated metallic structure 104*a* shown in FIG. 1) on or over the first tier, forming a third tier (e.g., corresponding to the third tier 106*c* of the HMC structure 100 shown in FIG. 1) including additional uncured fiber composite material on or over the second tier, forming a fourth tier (e.g., corresponding to the fourth tier 106*d* of the HMC structure 100 shown in FIG. 1) including additional uncured fiber composite material and at least one additional perforated metallic structure (e.g., corresponding to the second perforated metallic structure 104*b* shown in FIG. 1) on or over the third tier, and so on to form an uncured HMC structure exhibiting a desired configuration (e.g., size, shape, features, feature spacing, components, component arrangement, etc.) generally corresponding to a desired configuration of an HMC structure (e.g., HMC structure 100) to be subsequently formed therefrom.

The uncured fiber composite material of the first tier may be formed on or over the surface of the substrate using one or more conventional lay up processes (e.g., a resin transfer molding (RTM) process, a hand placement process, a filament winding process, etc.) and conventional processing equipment, which are not described in detail herein. As a non-limiting example, the uncured composite material may be formed on or over the substrate using an RTM process wherein fibers are placed into a mold in a desired arrangement, the mold is evacuated, an uncured matrix material (e.g., uncured resin) is introduced into the mold under pressure, and the temperature of the mold is controlled to permit the resin to set and form the uncured composite material. As another non-limiting example, the uncured composite material may be formed on or over the substrate using a hand placement process wherein fiber preforms (e.g., fiber tapes, fiber sheets, woven fiber fabrics, etc.) infiltrated with a uncured matrix material (e.g., uncured resin) are placed by hand on or over the substrate in a desired arrangement to form the uncured composite material. As an additional non-limiting example, the uncured composite material may be formed on or over the substrate using a filament winding process wherein fiber tows infiltrated with an uncured matrix material (e.g., uncured resin) are wound on or over the substrate using a filament winding apparatus. The substrate may comprise any structure exhibiting a desired geometric configuration (e.g., size, and shape), that is chemically and mechanically compatible with the uncured fiber composite material, and that is capable of withstanding the processing conditions (e.g., temperatures, pressures, ambient environment, etc.) used to form the uncured fiber composite material on or over the surface thereof. By way of non-limiting example, the substrate may comprise a mold core (e.g., a mandrel), another fiber composite material, a metal material, a ceramic material, at least a portion of a mold, or another material. In addition, the substrate may have any desired shape (e.g., flat, concave, convex, cylindrical, etc.) or combination of shapes. In some embodiments, the substrate comprises at least a portion of the subsequently formed HMC structure (e.g., at least a portion of the HMC structure 100 (FIG. 1)). In other embodiments, the substrate in absent (e.g., omitted) from the subsequently formed HMC structure.

Each of the perforated metallic structure and the additional uncured fiber composite material of the second tier may be formed on or over the uncured fiber composite material of the first tier using one or more conventional lay up processes and conventional processing equipment, which are not described in detail herein. By way of non-limiting example, the perforated metallic structure may be provided on or over the uncured fiber composite material of the first tier by a hand placement process, and the additional uncured fiber composite material may be formed laterally adjacent the perforated metallic structure and on or over the uncured fiber composite material of the first tier by one or more of an RTM process, a hand placement process, and a filament winding process. The perforated metallic structure and the additional uncured fiber composite material of the second tier may be formed to exhibit substantially the same thickness as one another.

The additional uncured fiber composite material of the third tier may be formed on or over the perforated metallic structure and the additional uncured fiber composite material of the second tier using one or more conventional lay up processes and conventional processing equipment, which are not described in detail herein. By way of non-limiting example, additional uncured fiber composite material of the third tier may be formed on or over the perforated metallic structure and the additional uncured fiber composite material of the second tier by one or more of an RTM process, a hand placement process, and a filament winding process. The additional uncured fiber composite material of the third tier may substantially cover an upper surface of the perforated metallic structure of the second tier.

Following the formation of the additional uncured fiber composite material of the third tier on or over the second tier, the stack of the first tier, the second tier, and the third tier may, optionally, be subjected to at least one pressing process to at least partially (e.g., substantially) remove one or more of gases (e.g., air) and excess uncured matrix material (e.g., uncured resin material) between adjacent tiers (e.g., between the first tier and the second tier, between the second tier and the third tier). If performed, the pressing process may compact the stack of the first tier, the second tier, and the third tier. In some embodiments, the first tier, the second tier, and the third tier are pressed to substantially remove gases and excess uncured matrix material therefrom. In additional embodiments, the pressing process may be postponed until one or more additional tiers (e.g., the fourth tier, the fifth tier, etc.) have been formed on or over the third tier.

One or more of processes used to form the first tier, the second tier, and the third tier may be repeated to form one or more additional tiers (e.g., the fourth tier, the fifth tier, the sixth tier, the seventh tier, etc.) of the uncured HMC structure. By way of non-limiting example, a fourth tier including another perforated metallic structure (e.g., corresponding to the second perforated metallic structure 104*b* shown in FIG. 1) and additional uncured fiber composite material may be formed on or over the third tier using one or more processes (e.g., an RTM process, a hand placement process, a filament winding process, etc.) substantially similar to those used to form the second tier, a fifth tier including additional uncured fiber composite material may be formed on or over the fourth tier using one or more processes substantially similar to those used to form the first tier, and the stack of the first tier through the fifth tier may, optionally, be subjected to at least one pressing process to remove gases (e.g., air) and uncured matrix material (e.g., excess uncured resin) between adjacent tiers (e.g., between the first tier and the second tier, between the second tier and the third tier, between the third tier and the fourth tier, and/or between the fourth tier and the fifth tier).

With continued reference to FIG. 3, the curing process 304 may include subjecting the uncured HMC structure to at least one of elevated temperature(s) and elevated pressure(s) (e.g., using a curing apparatus, such as a autoclave, a compression mold, or a lamination press) for a sufficient period of time to substantially cure the uncured HMC structure and form the HMC structure (e.g., the HMC structure 100 shown in FIG. 1). By way of non-limiting example, the uncured HMC structure may be exposed to a temperature within a range of from about 20° C. (e.g., about room temperature) to about 300° C. (e.g., from about 20° C. to about 50° C., from about 50° C. to about 100° C., from about 100° C. to about 200° C., from about 200° C. to about 300° C., etc.) for a period of time within a range of from about 30 minutes to about three (3) days (e.g., from about 30 minutes to about two (2) hours, from about two (2) hours to about twelve (12) hours, from about twelve (12) hours to about twenty-four (24) hours, from about twenty-four (24) hours to about two (2) days, from about two (2) days to about three (3) days) to cure the uncured HMC structure and form the HMC structure.

The finalization process 306, if performed, may include subjecting the HMC structure to one or more of a densification process (e.g., a sintering process), a material conversion process (e.g., a pyrolyzation process), a machining process, and a coating process. Whether or not the HMC structure is subjected to one or more of a densification process and a material conversion process at least partially depends on the material composition of the matrix material of the fiber composite material structures of the tiers of the HMC structure. As a non-limiting example, if the fiber composite material structures include an oxide-based ceramic matrix material, the HMC structure may be sintered (e.g., at temperature within a range of from about 1000° C. to about 1350° C.) to densify the HMC structure. As another non-limiting example, if the fiber composite material structures include a cured non-oxide-based pre-ceramic matrix material, the HMC structure may be pyrolyzed (e.g., at temperature within a range of from about 600° C. to about 1400° C.) convert at least a portion of the cured non-oxide-based pre-ceramic matrix material into a non-oxide-based ceramic matrix material. In addition, if performed, the machining process may include one or more of boring, trimming, and planarizing the HMC structure. By way of non-limiting example, one or more holes sized and configured to receive fasteners (e.g., bolts) may be machined in the HMC structure. In some embodiments, the HMC structure is machined proximate lateral sides thereof to permit the HMC structure to be mechanically coupled to at least one other HMC structure.

Figure 4:
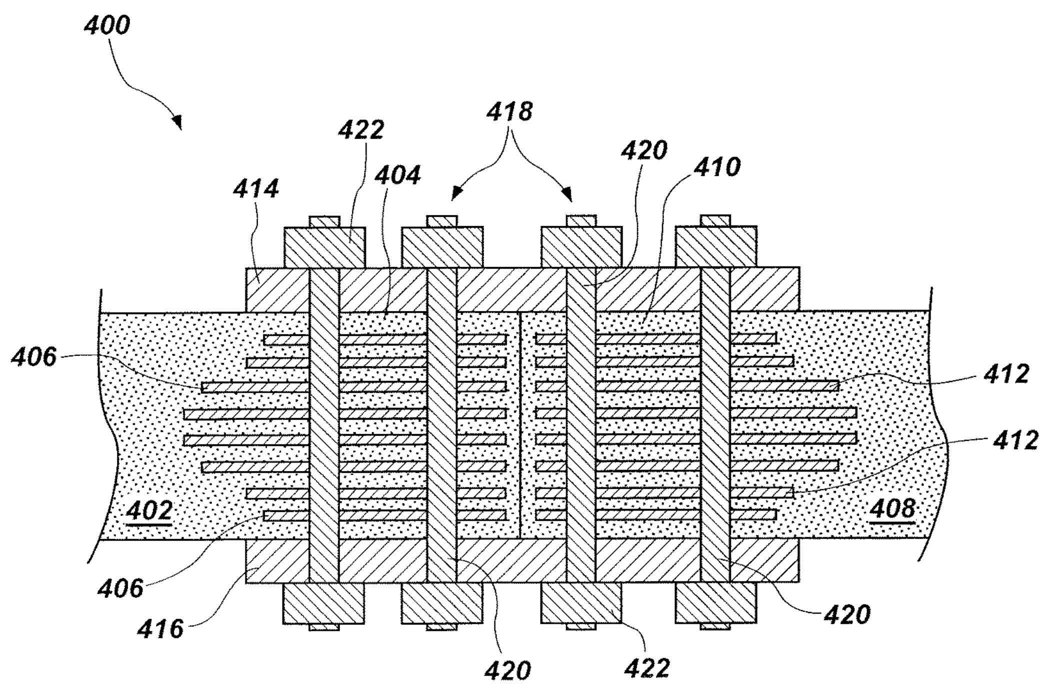
FIG. 4 is a cross-sectional view of an assembled, multi-component structure including coupled HMC structures, in accordance with embodiments of the disclosure.

FIG. 4 is a cross-sectional view of an assembled, multi-component structure 400 including a first HMC structure 402, a second HMC structure 408 laterally adjacent the first HMC structure 402, an outer joining structure 414 overlying portions of the first HMC structure 402 and the second HMC structure 408, an inner joining structure 416 underlying portions of the first HMC structure 402 and the second HMC structure 408, and fasteners 418 extending through the outer joining structure 414, the first HMC structure 402, the second HMC structure 408, and the inner joining structure 416. The outer joining structure 414, the inner joining structure 416, and the fasteners 418 may operatively couple the first HMC structure 402 to the second HMC structure 408.

As shown in FIG. 4, the first HMC structure 402 includes tiers of fiber composite material structures 404 and perforated metallic structures 406. The configurations (e.g., material compositions, peripheral sizes, peripheral shapes, components, component sizes, component shapes, component spacing, component features, component feature sizes, component feature shapes, component feature spacing, component feature density, component feature patterning, etc.) and positions of the fiber composite material structures 404 and the perforated metallic structures 406 may be substantially the same as, or may be different than the configurations and positions of the fiber composite material structures 102 and the perforated metallic structures 104 previously described with respect to FIG. 1. In addition, as also shown in FIG. 4, the second HMC structure 408 includes tiers of additional fiber composite material structures 410 and additional perforated metallic structures 412. The configurations (e.g., material compositions, peripheral sizes, peripheral shapes, spacing, features, feature sizes, feature shapes, feature spacing, feature density, feature patterning, etc.) and positions of the additional fiber composite material structures 410 and the additional perforated metallic structures 412 may be substantially the same as, or may be different than the configurations and positions of the fiber composite material structures 102 and the perforated metallic structures 104 previously described with respect to FIG. 1. The configurations of the first HMC structure 402 and the second HMC structure 408 may be substantially the same as one another, or may be different than one another. In some embodiments, the first HMC structure 402 and the second HMC structure 408 mirror one another. As used herein, the term "mirror" means and includes that at least two structures are mirror images of one another. For example, the first HMC structure 402 and the second HMC structure 408 may exhibit the substantially the same material compositions, peripheral sizes, peripheral shapes, components (e.g., fiber composite material structures, perforated metallic structures, etc.), component sizes, component shapes, component spacing, component features (e.g., perforations in the perforated metallic structures thereof), component feature sizes, component feature shapes, component feature spacing, component feature density, and component feature patterning as one another, but the first HMC structure 402 may outwardly extend in a direction that opposes a direction in which the second HMC structure 408 outwardly extends. As shown in FIG. 4, in some embodiments, the perforated metallic structures 406 of the first HMC structure 402 and the additional perforated metallic structures 412 of the second HMC structure 408 are laterally positioned proximate an interface of the first HMC structure 402 and the second HMC structure 408, and do not laterally extend across entireties of the first HMC structure 402 and the second HMC structure 408.

With continued reference to FIG. 4, the fasteners 418 may include elongate structures 420 (e.g., bolts, rods, studs, pins, etc.) and capping structures 422 (e.g., nuts, heads, etc.) coupled to ends of the elongate structures 420. The elongate structures 420 of a first portion of the fasteners 418 may longitudinally extend through the outer joining structure 414, the first HMC structure 402, and the inner joining structure 416. As shown in FIG. 4, the elongate structures 420 of the first portion of the fasteners 418 may longitudinally extend through the perforated metallic structures 406 of the first HMC structure 402. The perforated metallic structures 406 may enhance the bearing strength between the first HMC structure 402 and the elongate structures 420 of the first portion of the fasteners 418. In addition, the elongate structures 420 of second portion of the fasteners 418 may longitudinally extend through the outer joining structure 414, the second HMC structure 408, and the inner joining structure 416. As also shown in FIG. 4, the elongate structures 420 of the second portion of the fasteners 418 may longitudinally extend through the additional perforated metallic structures 412 of the second HMC structure 408. The additional perforated metallic structures 412 may enhance the bearing strength between the second HMC structure 408 and the elongate structures 420 of the second portion of the fasteners 418.

Figure 5:
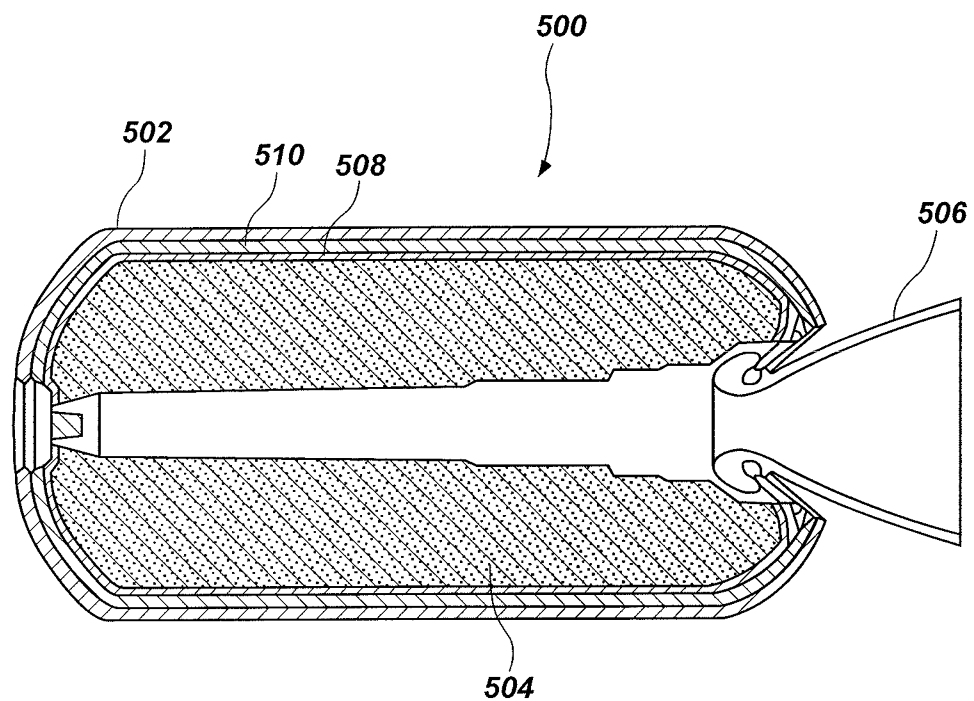
FIG. 5 is a simplified cross-sectional view of a rocket motor including one or more HMC structures, in accordance with embodiments of the disclosure.

FIG. 5 is a simplified cross-sectional view of a rocket motor 500 (e.g., a solid rocket motor), in accordance with embodiments of the disclosure. The rocket motor 500 may, for example, be configured to be a component (e.g., stage) of a larger assembly (e.g., a multi-stage rocket motor assembly), as described in further detail below. As shown in FIG. 5, the rocket motor 500 may include a casing 502, a propellant structure 504 disposed within the casing 502, a nozzle assembly 506 connected to an aft end of the casing 502. The rocket motor 500 may also include one or more of a liner structure 508 and an insulation structure 510 between the propellant structure 504 and the casing 502. For example, the liner structure 508 may be located on or over the propellant structure 504, and the insulation structure 510 may be located on and between the liner structure 508 and an inner surface of the casing 502.

The casing 502 may be formed of and include one or more HMC structures, such as one or more of the HMC structures 100, 402, and 408 previously described with respect to FIGS. 1 and 4. For example, the casing 502 may be formed of and include at least two (2) HMC structures coupled (e.g., connected) to one another in a manner substantially similar to that previously described with reference to FIG. 4 for connecting the first HMC structure 402 to the second HMC structure 408. Forming the casing 502 from a plurality of coupled HMC structures may permit at least some of the coupled HMC structures to be reused following the use of the rocket motor 500.

The propellant structure 504 may be formed of and include at least one propellant material, such as at least one solid propellant. Various examples of suitable solid propellants and components thereof are described in Thakre et al., *Solid Propellants*, Rocket Propulsion, Vol. 2, Encyclopedia of Aerospace Engineering, John Wiley & Sons, Ltd. 2010, the disclosure of which document is hereby incorporated herein in its entirety by this reference. The solid propellant may be a class 4.1, 1.4 or 1.3 material, as defined by the United States Department of Transportation shipping classification, so that transportation restrictions are minimized. By way of non-limiting example, the propellant of the propellant structure 504 may be formed of and include a polymer having one or more of a fuel and an oxidizer incorporated therein. The polymer may be an energetic polymer or a non-energetic polymer, such as glycidyl nitrate (GLYN), nitratomethylmethyloxetane (NMMO), glycidyl azide (GAP), diethyleneglycol triethyleneglycol nitraminodiacetic acid terpolymer (9DT-NIDA), bis(azidomethyl)-oxetane (BAMO), azidomethylmethyl-oxetane (AMMO), nitraminomethyl methyloxetane (NAMMO), bis(difluoroaminomethyl)oxetane (BFMO), difluoroaminomethylmethyloxetane (DFMO), copolymers thereof, cellulose acetate, cellulose acetate butyrate (CAB), nitrocellulose, polyamide (nylon), polyester, polyethylene, polypropylene, polystyrene, polycarbonate, a polyacrylate, a wax, a hydroxyl-terminated polybutadiene (HTPB), a hydroxyl-terminated poly-ether (HTPE), carboxyl-terminated polybutadiene (CTPB) and carboxyl-tenninated polyether (CTPE), diaminoazoxy furazan (DAAF), 2,6-bis(picrylamino)-3,5-dinitropyridine (PYX), a polybutadiene acrylonitrile/acrylic acid copolymer binder (PBAN), polyvinyl chloride (PVC), ethylmethacrylate, acrylonitrile-butadiene-styrene (ABS), a fluoropolymer, polyvinyl alcohol (PVA), or combinations thereof. The polymer may function as a binder, within which the one or more of the fuel and oxidizer is dispersed. The fuel may be a metal, such as aluminum, nickel, magnesium, silicon, boron, beryllium, zirconium, hafnium, zinc, tungsten, molybdenum, copper, or titanium, or alloys mixtures or compounds thereof, such as aluminum hydride ($AlH_3$), magnesium hydride ($MgH_2$), or borane compounds ($BH_3$). The metal may be used in powder form. The oxidizer may be an inorganic perchlorate, such as ammonium perchlorate or potassium perchlorate, or an inorganic nitrate, such as ammonium nitrate or potassium nitrate. Other oxidizers may also be used, such as hydroxylammonium nitrate (HAN), ammonium dinitramide (ADN), hydrazinium nitroformate, a nitramine, such as cyclotetramethylene tetranitramine (HMX), cyclotrimethylene trinitramine (RDX), 2,4,6,8,10,12-hexanitro-2,4,6,8,10,12-hexaazaisowurtzitane (CL-20 or HNIW), and/or 4,10-dinitro-2,6,8,12-tetraoxa-4,10-diazatetracyclo-[$5.5.0.0^{5,9}.0^{3,11}$]-dodecane (TEX). In addition, the propellant of the propellant structure 504 may include additional components, such as one or more of a plasticizer, a bonding agent, a combustion rate modifier, a ballistic modifier, a cure catalyst, an antioxidant, and a pot life extender, depending on the desired properties of the propellant. These additional components are well known in the rocket motor art and, therefore, are not described in detail herein. The components of the propellant of the propellant structure 504 may be combined by conventional techniques, which are not described in detail herein.

With continued reference to FIG. 5, nozzle assembly 506 may be cooperatively associated with the casing 502 and the propellant structure 504 so as to produce a desired thrust. The nozzle assembly 506 may be stationary (e.g., fixed), or may be adjustable to selectively alter the course of flight of the rocket motor 500 (and, hence, of a launch vehicle including the rocket motor 500). In some embodiments, the nozzle assembly 506 includes a thrust nozzle, a flexible bearing assembly connected to the thrust nozzle and the casing 502, and at least one actuator connected to the thrust nozzle. Lateral movement of the flexible bearing assembly by way of the actuator may be used to modify the position of the thrust nozzle so as to control the direction of the rocket motor 500 (and, hence, of a launch vehicle including the rocket motor 500) during use and operation (e.g., flight) thereof. Suitable configurations (e.g., components, component shapes, component sizes, component materials, component arrangements, etc.) for the nozzle assembly 506 are well known in the rocket motor art and, therefore, are not described in detail herein.

Figure 6:
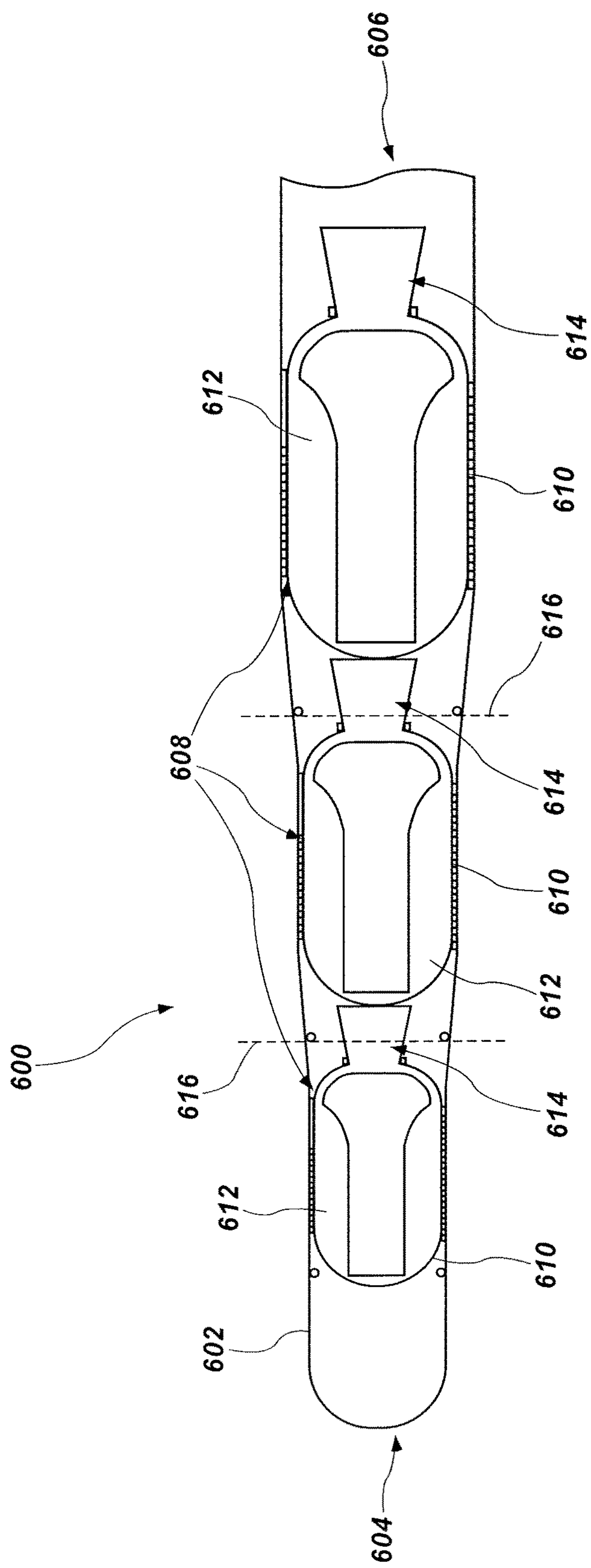
FIG. 6 is a simplified cross-sectional view of a multi-stage rocket motor assembly including one or more HMC structures, in accordance with embodiments of the disclosure.

FIG. 6 is a cross-sectional view of a multi-stage rocket motor assembly 600, in accordance with an embodiment of the disclosure. The multi-stage rocket motor assembly 600 may include an outer housing 602 having a closed forward end 604 and an open aft end 606. The outer housing 602 may formed of and include one or more HMC structures, such as one or more of the HMC structures 100, 402, and 408 previously described with respect to FIGS. 1 and 4. For example, the outer housing 602 may be formed of and include at least two (2) HMC structures coupled (e.g., connected) to one another in a manner substantially similar to that previously described with reference to FIG. 4 for connecting the first HMC structure 402 to the second HMC structure 408. The multi-stage rocket motor assembly 600 may also include plurality of stages 608 provided in an end-to-end relationship with one another within the outer housing 602. For example, as shown in FIG. 6, the multi-stage rocket motor assembly 600 may include three (3) stages 608 each contained within the outer housing 602. In additional embodiments, the multi-stage rocket motor assembly 600 may include a different number of stages 608, such as from one (1) stage to ten (10) stages. The stages 608 may include casings 610, propellant structures 612 with the casings 610, and nozzle assemblies 614 physically connected to aft ends of the casings 610. One or more of the stages 608 may be substantially similar to the rocket motor 500 previously described with reference to FIG. 5. The outer housing 602 may be configured to be severable at locations 616, as indicated by dashed lines, associated with the stages 608 during use and operation of the multi-stage rocket motor assembly 600 (e.g., following combustion of the propellant structure 612 within a given one of the stages 608).

The HMC structures (e.g., the HMC structure 100 shown in FIG. 1) of the disclosure may exhibit improved properties as compared to conventional fiber composite material structures. For example, the HMC structures including the perforated metallic structures (e.g., the perforated metallic structures 104 shown in FIGS. 1 through 2D) of the disclosure may exhibit enhanced strength, enhanced structural integrity, and reduced weight as compared to conventional fiber composite material structures. The perforated metallic structures may, for example, increase the bearing strength of the HMC structures when the HMC structures are coupled (e.g., by way of fixture assembly, such as a bolted fixture) to one or more other structures. In addition, the perforations (e.g., the perforations 110 shown in FIGS. 1 through 2D) in the perforated metallic structures may facilitate the removal of undesirable gases and excess matrix material during the HMC structures that may otherwise result in decreased structural integrity and/or increased composite material thickness to account for the undesirable gases and excess matrix material. In turn, multi-component structures (e.g., the multi-component structure 400 shown in FIG. 4), rocket motors (e.g., the rocket motor 500 shown in FIG. 5), and rocket motor assemblies (e.g., the multi-stage rocket motor assembly 600 shown in FIG. 6) including the HMC structures may exhibit improved performance, increased efficiency, increased reliability, reduced costs (e.g., material costs, equipment costs, etc.), reduced weight, increased simplicity, and/or increased safety as compared to many conventional multi-component structures, rocket motors, and multi-stage rocket motor assemblies not including the HMC structures.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of the disclosure.

What is claimed is:

1. A hybrid metal composite (HMC) structure, comprising:

tiers comprising fiber composite material structures, the tiers including an upper tier and a lower tier laterally aligned along respective first lateral edges and opposite second lateral edges; and additional tiers longitudinally alternating with the tiers and comprising:

perforated metallic structures directly on the fiber composite material structures of the tiers, the perforated metallic structures each individually comprising one or more of Fe, Co, Ni, Cu, Al, Mg, Ti, W, Nb, V, Hf, Ta, Cr, Zr, and Si; and additional fiber composite material structures contacting at least two opposing lateral sides of each of the perforated metallic structures such that the perforated metallic structures are proximate a terminal end of the HMC structure and the terminal end of the HMC structure consists of fiber composite material structures, the additional tiers further including:

a first additional tier comprising a first perforated metallic structure having:

a first additional lateral edge adjacent a first additional fiber composite material structure; and a first opposing lateral edge laterally opposite the first additional lateral edge, the first opposing lateral edge positioned proximate the terminal end of the HMC;

a second additional tier comprising a second perforated metallic structure having:

a second additional lateral edge adjacent a second additional fiber composite material structure and laterally offset from the first additional lateral edge in a first lateral direction; and a second opposing lateral edge laterally opposite the second additional lateral edge, the second opposing lateral edge positioned proximate the terminal end of the HMC and substantially laterally aligned with the first opposing lateral edge in the first lateral direction; and a third additional tier comprising a third perforated metallic structure having:

a third additional lateral edge adjacent a third additional fiber composite material structure and laterally offset from the second additional lateral edge in the first lateral direction; and a third opposing lateral edge laterally opposite the third additional lateral edge, the third opposing lateral edge positioned proximate the terminal end of the HMC and substantially laterally aligned with the second opposing lateral edge in the first lateral direction.

2. The HMC structure of claim 1, wherein each of the additional tiers comprises at least one of the perforated metallic structures and at least one of the additional fiber composite material structures.

3. The HMC structure of claim 1, wherein each of the perforated metallic structures independently exhibits perforations extending completely therethrough and additional perforations extending only partially therethrough.

4. The HMC structure of claim 3, wherein the perforations exhibit one or more of cylindrical shapes, semi-cylindrical shapes, cuboidal shapes, cubic shapes, conical shapes, pyramidal shapes, truncated versions thereof, and irregular shapes.

5. The HMC structure of claim 3, wherein the perforations each independently exhibit at least one lateral dimension within a range of from about 25.4 μm to about 3,810 μm.

6. The HMC structure of claim 3, wherein each of the perforations is independently laterally spaced apart from each other of the perforations adjacent thereto by a distance within a range of from about 25.4 μm to about 25,400 μm.

7. The HMC structure of claim 3, wherein a density of the perforations is within a range of from about 100 perforations/$ft^2$ to about 5,000 perforations/$ft^2$.

8. The HMC structure of claim 3, wherein a lateral area occupied by the perforations within at least one of the perforated metallic structures is within a range of from about 0.1 percent to about 30 percent of an overall lateral area of the at least one of the perforated metallic structures.

9. The HMC structure of claim 3, wherein the perforations are distributed across at least one of the perforated metallic structures in a square array.

10. The HMC structure of claim 3, wherein the perforations are distributed across at least one of the perforated metallic structures in a hexagonal array.

11. The HMC structure of claim 1, wherein at least two of the perforated metallic structures exhibit one or more of different perforation sizes, different perforation shapes, different perforation spacing, different perforation density, and different perforation arrangements than one another.

12. The HMC structure of claim 1, wherein lateral peripheral dimensions of at least one of the perforated metallic structures are different than lateral peripheral dimensions of at least one other of the perforated metallic structures.

13. The HMC structure of claim 1, wherein:

each of the perforated metallic structures has a coefficient of thermal expansion within a range of from about $3\times10^{-6}$/K to about $25\times10^{-6}$/K at about 25° C.; and at least a matrix material of the fiber composite material structures has a coefficient of thermal expansion within a range of from about $45\times10^{-6}$/K to about $65\times10^{-6}$/K at about 25° C.

14. A method of forming a hybrid metal composite (HMC) structure, comprising:

forming a first tier comprising a first fiber composite material over a substrate;

forming a second tier over the first tier, the second tier comprising:

a first perforated metallic structure directly on the first fiber composite material of the first tier and comprising one or more of Fe, Co, Ni, Cu, Al, Mg, Ti, W, Nb, V, Hf, Ta, Cr, Zr, and Si, the first perforated metallic structure having at least two opposing lateral sides including a first lateral edge and a first opposing lateral edge opposite the first lateral edge; and a first additional fiber composite material contacting the at least two opposing lateral sides of the first perforated metallic structure such that the first perforated metallic structure is proximate a terminal end of the HMC structure and the terminal end of the HMC structure consists of fiber composite materials;

forming additional tiers including:

forming a first additional tier comprising a second fiber composite material over the second tier;

forming a second additional tier over the first additional tier, the second additional tier comprising a second perforated metallic structure having:

a second additional lateral edge adjacent a second additional fiber composite material structure and laterally offset from the first lateral edge in a first lateral direction; and a second additional opposing lateral edge laterally opposite the second additional lateral edge, the second additional opposing lateral edge substantially laterally aligned with the first opposing lateral edge in the first lateral direction, the second additional opposing lateral edge positioned proximate the terminal end of the HMC;

forming a third additional tier comprising a third fiber composite material over the second additional tier;

forming a fourth additional tier over the third additional tier, the fourth additional tier comprising a third perforated metallic structure having:

a third additional lateral edge adjacent a third additional fiber composite material structure and laterally offset from the second additional lateral edge in the first lateral direction; and a third additional opposing lateral edge laterally opposite the third additional lateral edge, the third additional opposing lateral edge substantially laterally aligned with the second additional opposing lateral edge in the first lateral direction, the third additional opposing lateral edge positioned proximate the terminal end of the HMC;

forming a fifth additional tier comprising a fourth fiber composite material over the fourth additional tier, the first tier and the fifth additional tier laterally aligned along respective first lateral edges and opposite second lateral edges; and subjecting at least the first tier, the second tier, the first additional tier, the second additional tier, the third additional tier, the fourth additional tier, and the fifth additional tier to at least one curing process.

15. The method of claim 14, further comprising forming at least the first perforated metallic structure to exhibit perforations extending completely therethrough.

16. The method of claim 15, wherein forming the at least the first perforated metallic structure to exhibit perforations extending completely therethrough comprises subjecting a non-perforated metallic structure to one or more of a laser treatment process, a mechanical drilling process, and a die punch perforation process.

17. The method of claim 15, wherein forming the at least the first perforated metallic structure to exhibit perforations extending completely therethrough comprises forming at least one of the perforations to exhibit one or more of a different size and a different shape than at least one other of the perforations.

18. A rocket motor, comprising:

a casing comprising:

a hybrid metal composite (HMC) structure comprising:

primary tiers comprising fiber composite material structures; and secondary tiers longitudinally adjacent one or more of the primary tiers and comprising:

perforated metallic structures directly on the fiber composite material structures of the primary tiers, the perforated metallic structures each individually comprising one or more of Fe, Co, Ni, Cu, Al, Mg, Ti, W, Nb, V, Hf, Ta, Cr, Zr, and Si; and additional fiber composite material structures laterally adjacent the perforated metallic structures on at least two opposing lateral sides of each of the perforated metallic structures such that the perforated metallic structures are proximate a lateral edge of the HMC structure and the lateral edge of the HMC structure consists of fiber composite material structures;

wherein:

first lateral edges of the perforated metallic structures vertically neighboring one another are laterally offset from one another;

second lateral edges of the perforated metallic structures vertically neighboring one another are laterally aligned with one another, the second lateral edges laterally opposing the first lateral edges, the second lateral edges positioned proximate the lateral edge of the HMC structure; and at least one of the perforated metallic structures comprises at least two perforations, a first of the at least two perforations exhibiting one or more of a different size and a different shape than a second of the at least two perforations; and an additional HMC structure connected to the HMC structure, the additional HMC structure comprising:

an additional lateral edge physically abutting the lateral edge of the HMC structure;

additional primary tiers comprising additional fiber composite material structures; and additional secondary tiers longitudinally adjacent one or more of the additional primary tiers and comprising additional perforated metallic structures and further additional fiber composite material structures;

a propellant structure within the casing; and a nozzle assembly connected to an aft end of the casing.

19. The rocket motor of claim 18, wherein the HMC structure is connected to the additional HMC structure through at least one fastener assembly comprising:

an outer joining structure overlying portions of the HMC structure and the additional HMC structure;

an inner joining structure underlying the portions of the HMC structure and the additional HMC structure; and fasteners longitudinally extending through the outer joining structure, the portions of the HMC structure and the additional HMC structure, and the inner joining structure.

20. The rocket motor of claim 19, wherein the fasteners of the at least one fastener assembly comprise:

elongate structures longitudinally extending through the outer joining structure, the portions of the HMC structure and the additional HMC structure, and the inner joining structure; and capping structures connected to opposing ends of each of the elongate structures.

21. The rocket motor of claim 20, wherein a portion of the elongate structures of the at least one fastener assembly longitudinally extends through at least some of the perforated metallic structures of the HMC structure, and wherein another portion of the elongate structures of the at least one fastener assembly longitudinally extends through at least some of the additional perforated metallic structures of the additional HMC structure.

22. A multi-stage rocket motor assembly, comprising:

an outer housing having a closed forward end and an open aft end, and comprising a first hybrid metal composite (HMC) structure comprising:

first tiers comprising fiber composite material structures; and first additional tiers longitudinally adjacent one or more of the first tiers and comprising:

perforated metallic structures directly on the fiber composite material structures of the first tiers, the perforated metallic structures each individually comprising one or more of Fe, Co, Ni, Cu, Al, Mg, Ti, W, Nb, V, Hf, Ta, Cr, Zr, and Si; and additional fiber composite material structures contacting at least two opposite lateral sides of each of the perforated metallic structures such that the perforated metallic structures are proximate a first terminal end of the HMC structure, the first terminal end of the HMC structure consisting of fiber composite material structures;

wherein first lateral edges of the perforated metallic structures vertically neighboring one another are laterally offset from one another, and second lateral edges of the perforated metallic structures opposite the first lateral edges are laterally aligned with one another, the second lateral edges positioned adjacent to the first terminal end of the HMC structure; and a second HMC structure connected to the first HMC structure, the second HMC structure comprising:

a second terminal end physically abutting the first terminal end of the first HMC structure;

second tiers comprising additional fiber composite material structures; and second additional tiers longitudinally adjacent one or more of the second tiers and comprising additional perforated metallic structures and further fiber composite material structures; and stages provided in an end-to-end relationship with one another within the outer housing, each of the stages independently comprising:

a casing;

a propellant structure within the casing; and a nozzle assembly connected to an aft end of the casing.

* * * * *